(12) United States Patent
Bozler et al.

(10) Patent No.: US 7,218,191 B2
(45) Date of Patent: May 15, 2007

(54) MICRO-ELECTRO MECHANICAL SWITCH DESIGNS

(75) Inventors: Carl O. Bozler, Waltham, MA (US);
Shaun R. Berry, Allston, MA (US);
Jeremy Muldavin, Westford, MA (US);
Craig L. Keast, Groton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 60 days.

(21) Appl. No.: 11/092,462

(22) Filed: Mar. 29, 2005

(65) Prior Publication Data
US 2006/0220767 A1   Oct. 5, 2006

(51) Int. Cl.
*H01P 1/10* (2006.01)
*H03K 17/975* (2006.01)
(52) U.S. Cl. ..................... 333/262; 200/600
(58) Field of Classification Search ............... 333/262; 200/181, 600; 361/278; 359/290
See application file for complete search history.

(56) References Cited

U.S. PATENT DOCUMENTS

| | | | | |
|---|---|---|---|---|
| 5,959,763 | A * | 9/1999 | Bozler et al. ............... | 359/290 |
| 6,625,004 | B1 * | 9/2003 | Musolf et al. .............. | 361/278 |
| 6,646,215 | B1 * | 11/2003 | Nelson ....................... | 200/181 |
| 6,646,525 | B2 * | 11/2003 | Bozler et al. ............... | 333/246 |
| 7,002,441 | B2 | 2/2006 | Pillans et al. ................ | 335/78 |

FOREIGN PATENT DOCUMENTS

WO   WO 02/079076   6/2001

OTHER PUBLICATIONS

Muldavin et al., "Large Tuning Range Analog and Multi-bit MEMS Varactors" Microwave Symposium Digest, 2004 IEEE, vol. 3, pp. 1919-1922.
Muldavin et al. "Power Handling and Linearity of MEM Captacitive Series Switch" 2003 IEEE MIT-S International Symposium Digest 2003, pp. 1915-1918.
Bozler et al., "MEMS Microswitch Arrays for Reconfigurable Distributed Microwave Components" IEEE, MIT-S International Microwave Symposium Digest, 2000, vol. 1, pp. 153-156.
Pillans et al., "Advances in RF MEMS Technology" 2000 IEEE, Annual IEEE Gallium Arsenide Integrated Circuit Symposium, pp. 17-20.

* cited by examiner

*Primary Examiner*—Dean Takaoka
(74) *Attorney, Agent, or Firm*—Gauthier & Connors LLP

(57) ABSTRACT

A capacitive RF switch and DC RF switch include a fixed electrode having a thin layer of metal and at least one pull-down electrode. A moving plate has a plurality of corrugations and a selective finger design. The capacitive switch includes a selective finger that comes into contact with the fixed electrode so as to minimize the stiction between the moving plate and the fixed electrode when the switch is closed. The DC switch comprises a plurality of dimples that are formed on the selective portion of the moving plate and are positioned to come into contact with the fixed electrode when the switch is closed so as to increase the contact force and lower the resistance between the moving plate and fixed electrode.

60 Claims, 24 Drawing Sheets

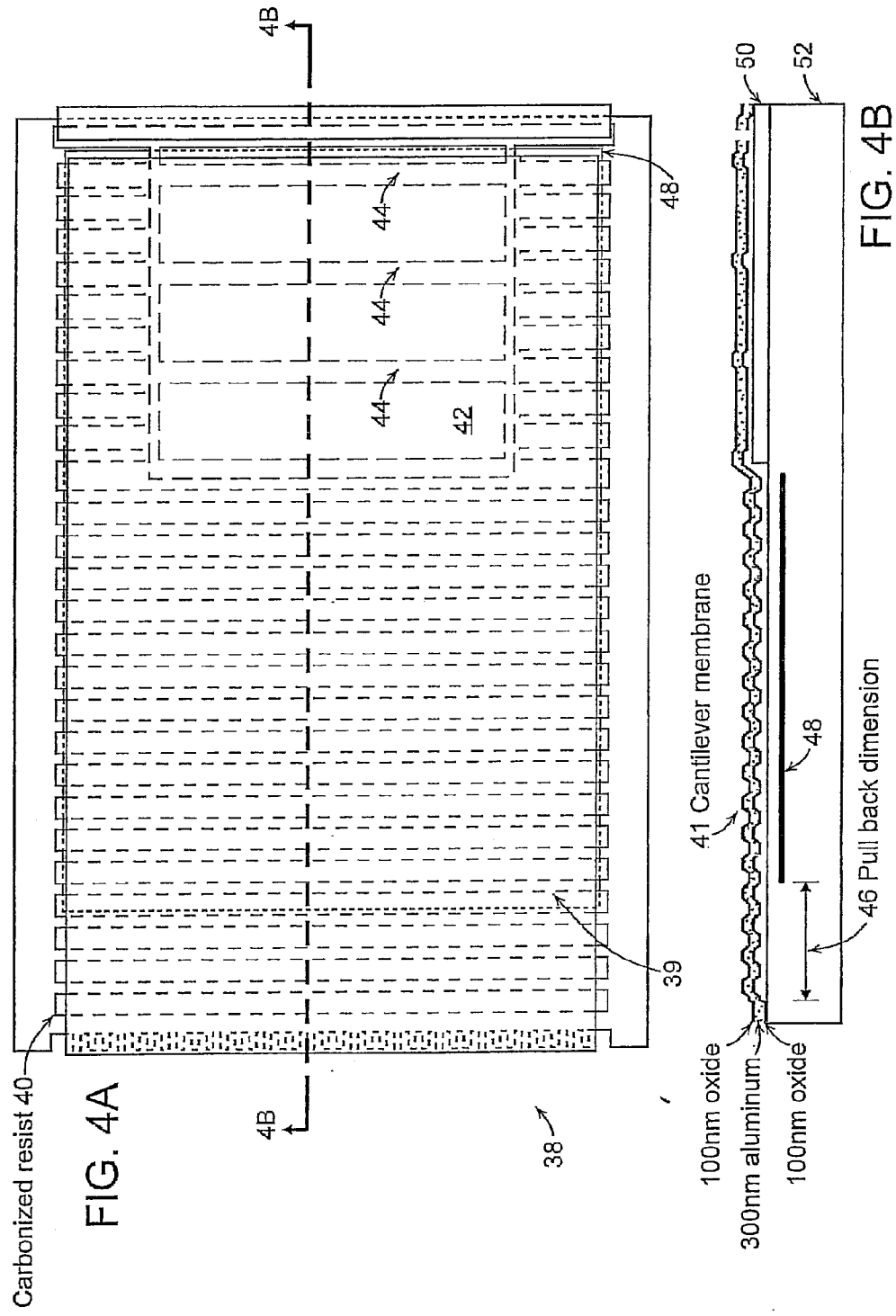

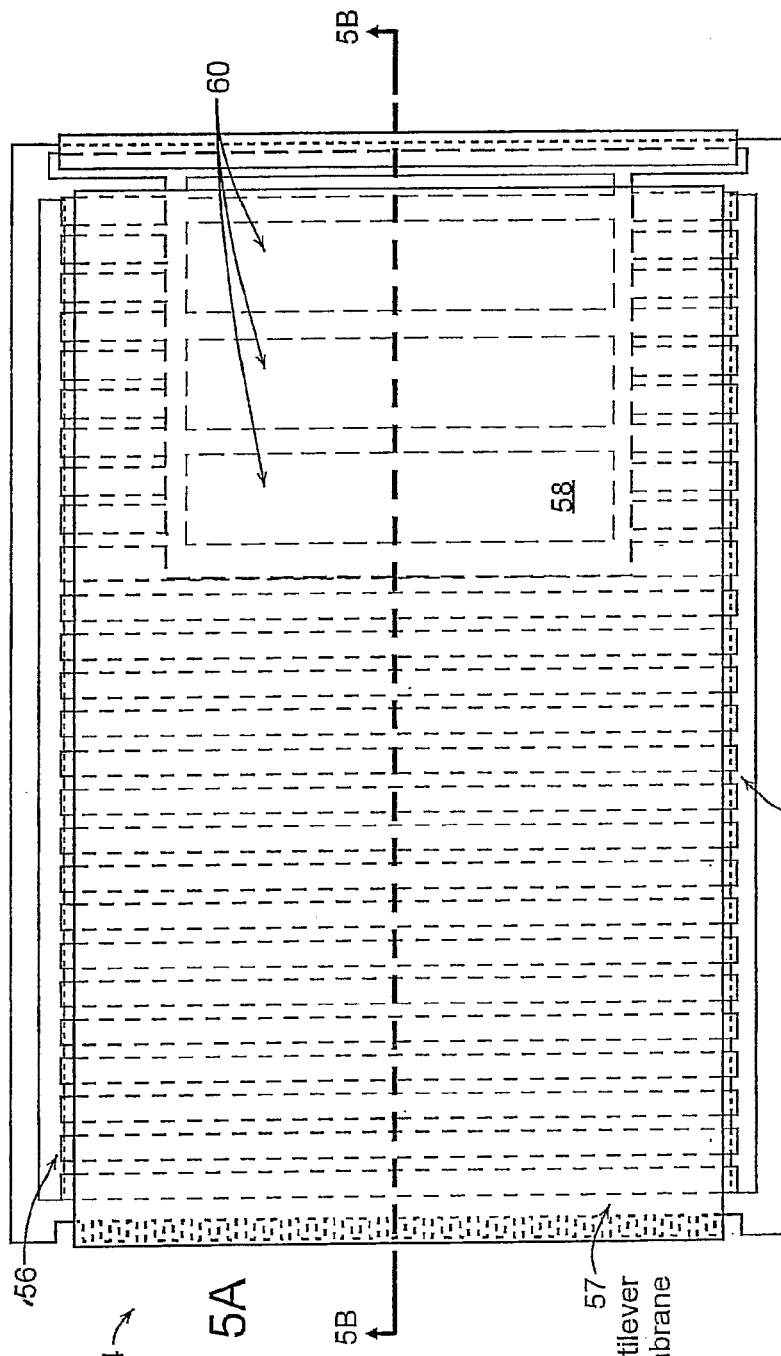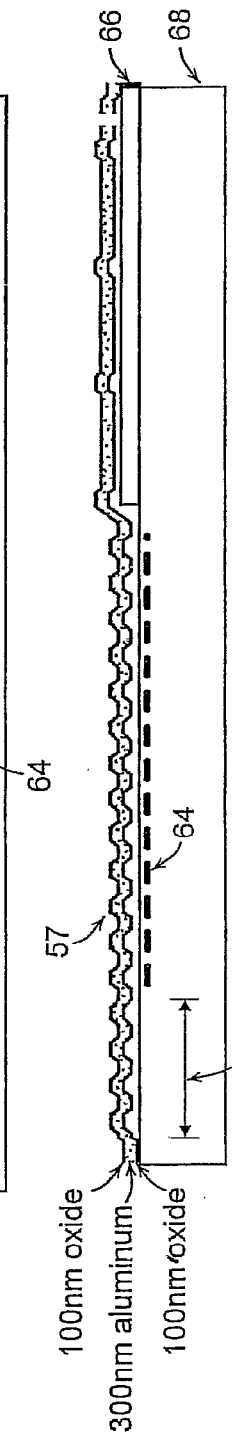

Top View

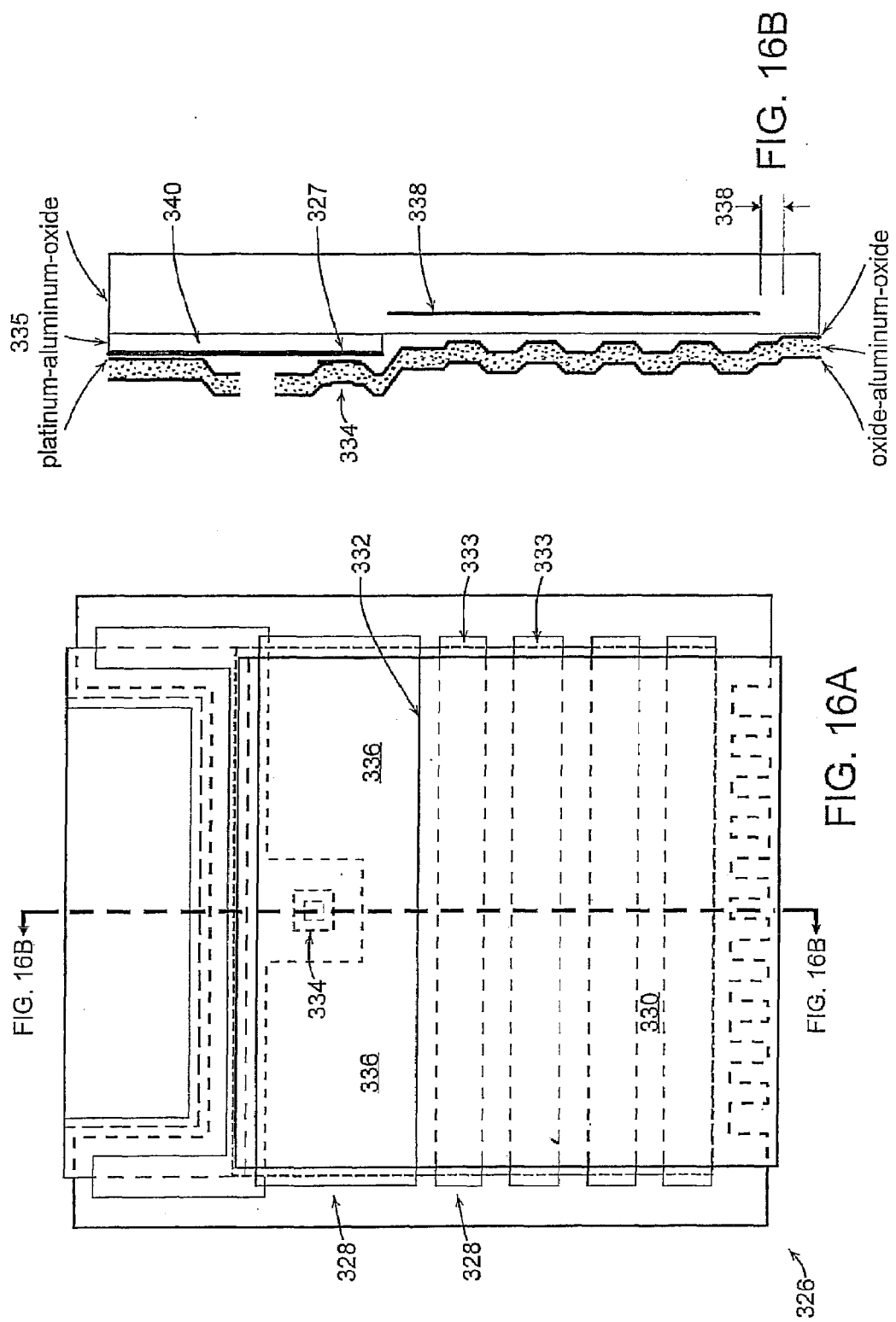

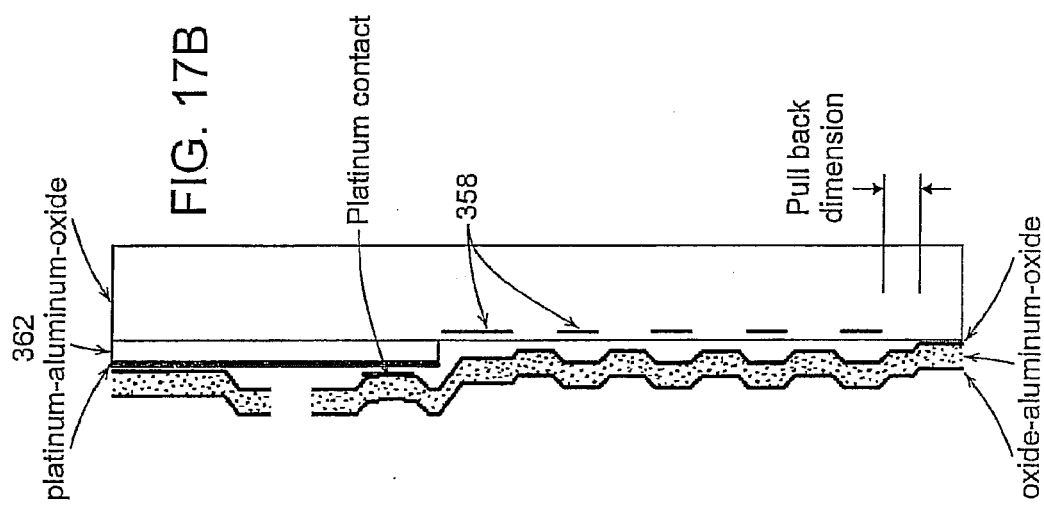
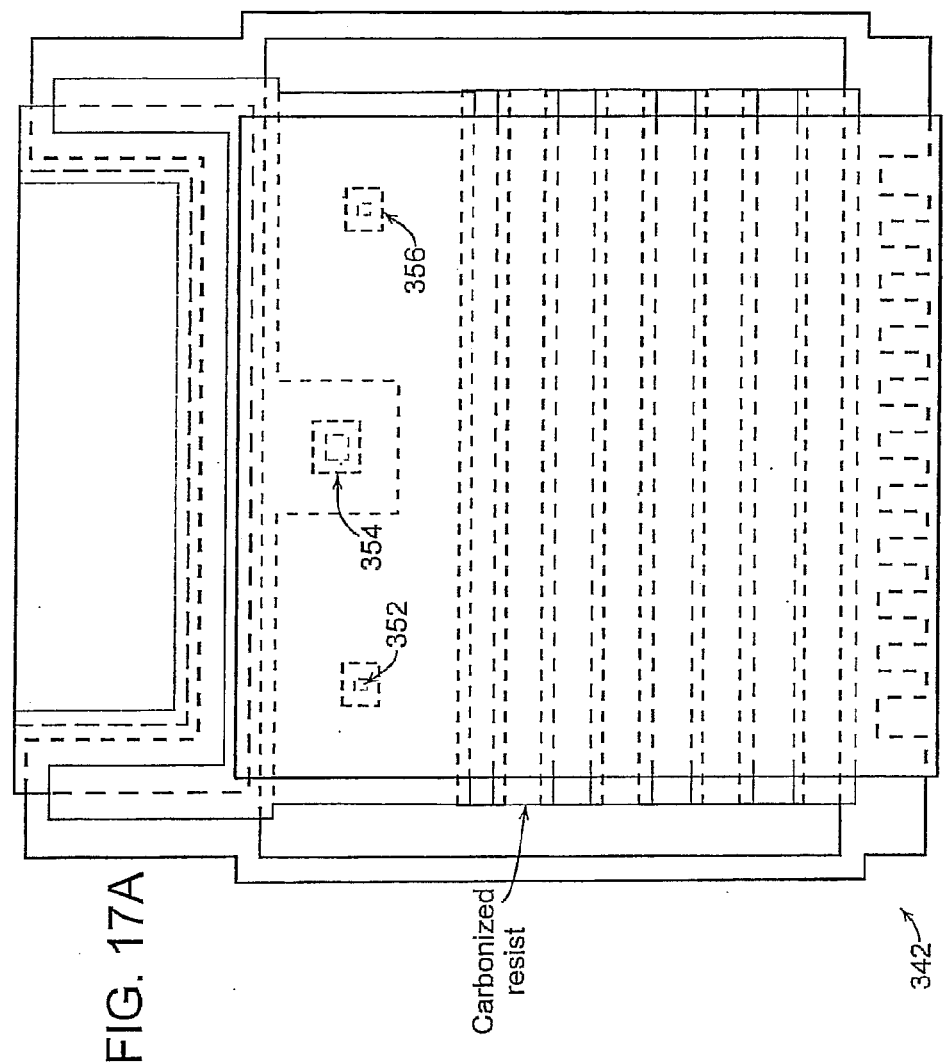

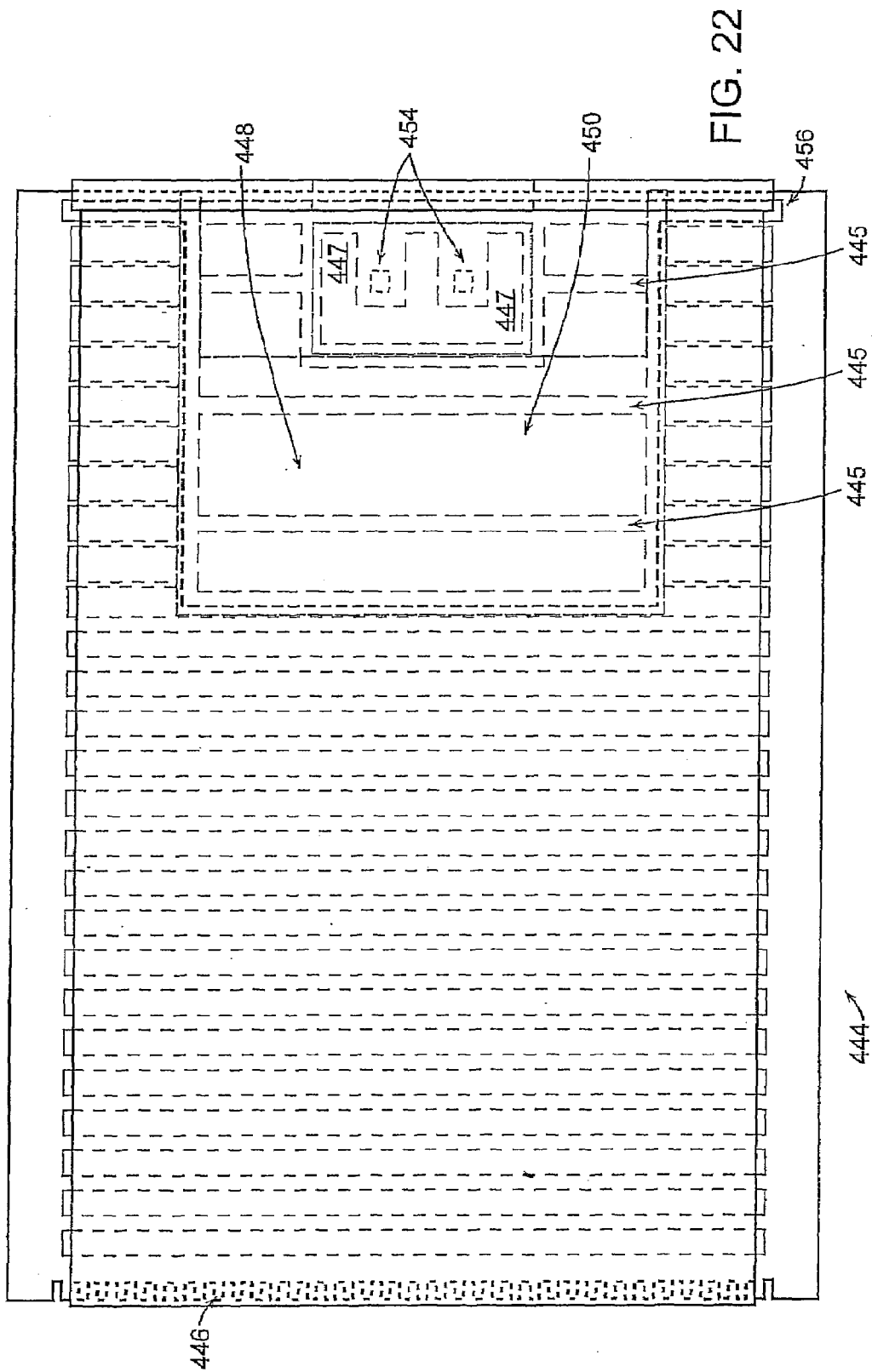

MICRO-ELECTRO MECHANICAL SWITCH DESIGNS

This invention was made with government support under Contract Number. F19628-00-C-0002, awarded by the Air Force. The government has certain rights in the invention.

BACKGROUND OF THE INVENTION

The invention relates to the field of RF switches, and in particular to capacitive and DC types of RF switches having lower switch actuation thresholds, reduced field-induced stiction, and lower DC contact resistance.

A single RF capacitive switch in a coplanar waveguide can be comprised of a 200 µm long and 150 µm wide film of silicon dioxide and aluminum which forms a cantilever membrane. Stress is built into the membrane that causes it to curl upward away from a substrate. Moreover, the membrane includes a 50 µm long and 150 µm wide section at its end that forms one plate of a capacitor or moving plate. A voltage is applied between a buried electrode in the substrate and the membrane, which causes the membrane to pull and bring the moving plate into intimate contact with a similarly sized fixed electrode. This results in increasing the capacitance between the fixed electrode and moving plate.

A DC RF switch has a similar design except that the membrane is shorter, narrower, and has platinum contacts at the end of its curled up membrane. Also, the DC RF switch includes a platinum fixed contact on the surface of the substrate. With applied voltage, the moving platinum contact is brought in contact with the fixed platinum contact on the surface of the substrate, closing the DC circuit.

However, there is a need to have enhancements in both DC and capacitive switches that target lower switch actuation thresholds, reducing field-induced stiction, enabling x-y addressability in switch arrays, and dual-mode DC/capacitive switches.

SUMMARY OF THE INVENTION

According to one aspect of the invention, there is provided a capacitive RF switch. The capacitive RF switch includes a fixed electrode and at least one pull-down electrode. A moving plate includes a plurality of corrugations and a selective finger design that is formed on a selective portion of the moving plate. The selective finger is configured so as to minimize the stiction between the fixed electrode and moving plate when the switch is closed.

According to another aspect of the invention, there is provided a DC RF switch. The DC RF switch includes a fixed electrode having a thin layer of metal and at least one pull-down electrode. A moving plate includes a plurality of corrugations and a selective finger design. The moving plate includes at least one dimple that is formed on a selective portion of the moving plate. The at least one of the dimple is positioned to come into contact with the fixed electrode when the switch is closed so as to increase the contact force lowering the resistance between the moving plate and fixed electrode.

According to another aspect of the invention, there is provided an RF switch. The RF switch includes a fixed electrode having a thin layer of metal and at least one pull-down electrode. A moving plate includes a plurality of corrugations and a selective finger design. The moving plate also has a selective portion that comprises a capacitive switch and a DC switch. The moving plate comprises a selective finger that comes into contact with the fixed electrode so as to minimize the stiction between the moving plate and the fixed electrode when the switch is closed. The DC switch comprises at least one dimple that is formed on the selective portion of the moving plate and are positioned to come into contact with the fixed electrode when the switch is closed so as to increase the contact force and lower the resistance between the moving plate and fixed electrode.

According to another aspect of the invention, there is provided a method of forming a capacitive RF switch. The method includes providing a fixed electrode and at least one pull-down electrode. The method also includes providing a moving plate having a plurality of corrugations and a selective finger design that is formed on a selective portion of the moving plate. The selective finger is configured so as to minimize the stiction between the fixed electrode and moving plate when the switch is closed.

According to another aspect of the invention, there is provided a method of forming a DC RF switch. The method includes providing a fixed electrode having a thin layer of metal and at least one pull-down electrode. In addition, the method includes providing a third electrode which is a moving plate having a plurality of corrugations and a selective finger design. The moving plate has at least one dimple that is formed on a selective portion of the moving plate. The dimples are positioned to come into contact with the electrode when the switch is closed so as to increase the contact force and lower resistance between the moving plate and fixed electrode.

According to another aspect of the invention, there is provided a method of forming an RF switch. The method includes providing a fixed electrode having a thin layer of metal and at least one pull-down electrode. In addition, the method includes providing a moving plate that has a plurality of corrugations and a selective finger design. The moving plate also has a selective portion that comprises a capacitive switch and a DC switch. The capacitive switch comprises a selective finger that comes into contact with the fixed electrode so as to minimize the stiction between the moving plate and the fixed electrode when the switch is closed. The DC switch comprises at least one dimple that is formed on the selective portion of the moving plate and is positioned to come into contact with the fixed electrode when the switch is closed so as to increase the contact force and lower the resistance between the moving plate and fixed electrode.

BRIEF DESCRIPTION OF THE DRAWINGS

FIG. 4A–4B are schematics of another embodiment of the inventive capacitive switch;

FIGS. 5A–5B are schematics of a third embodiment of the inventive capacitive switch;

FIGS. 16 are schematics of dimples;

FIGS. 17A–18B are schematics of a DC switch having a one finger and dimple;

FIGS. 18A–18B are schematics of a DC switch having a one-finger design and three dimples;

FIG. 22 is a schematic of a switch having a one-finger capacitor and two-finger DC switch design.

DETAILED DESCRIPTION OF THE INVENTION

Figure 1:
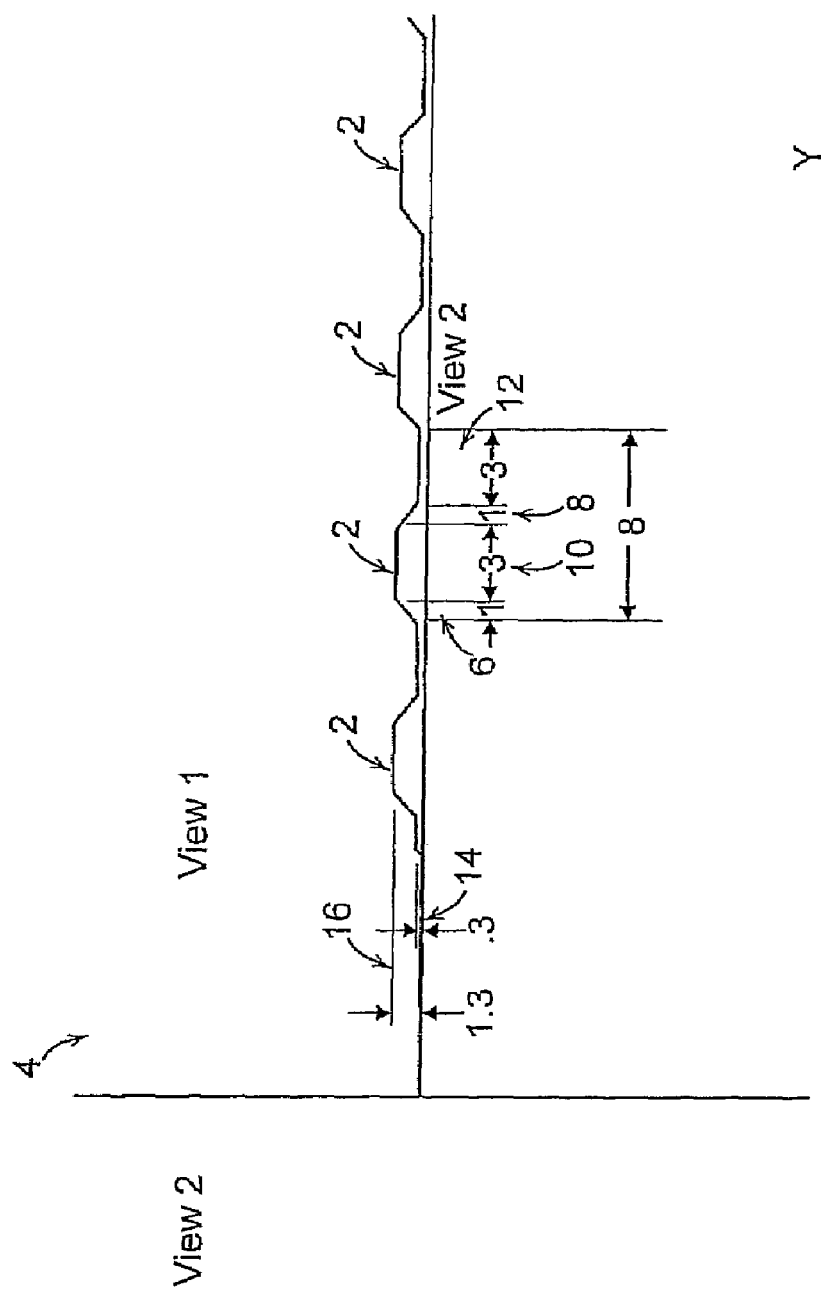
FIG. 1 is a schematic of the corrugations used in accordance with the invention.

FIG. 1 is a schematic of corrugations 2 used in accordance with the invention. Switches configured in accordance with the invention have corrugations 2 that are increased in size as compared to the prior art. Moreover, the design is meant to keep the cantilever membrane 4 flatter and therefore reduces the voltage threshold.

In particular, FIG. 1 shows a cross-section of a membrane used with the invention. The membrane 4 includes several corrugations 2 of equal dimensions. In addition, FIG. 1 illustrates two views (view 1 and view 2) of the corrugations 2. View 1 demonstrates the external dimensions of a corrugation and the view 2 demonstrates the internal dimensions of the same corrugation. View 2 divides a corrugation 2 into a first side region 6, a second side region 8, an elevated region 10, and a bottom region 12. The first side region 6 is sized at 1 µm and the second side region 8 is sized at also 1 µm. In addition, the elevated region 10 is sized at 3 µm and the bottom region 12 is sized at 3 µm.

View 1 divides the external regions of the corrugation in two regions, second elevated region 16 and second bottom region 14. The second elevated region 16 is sized at 1.3 µm and second bottom region 14 at 0.3 µm. The dimensions demonstrated by view 1 and 2 can vary.

Figure 2:
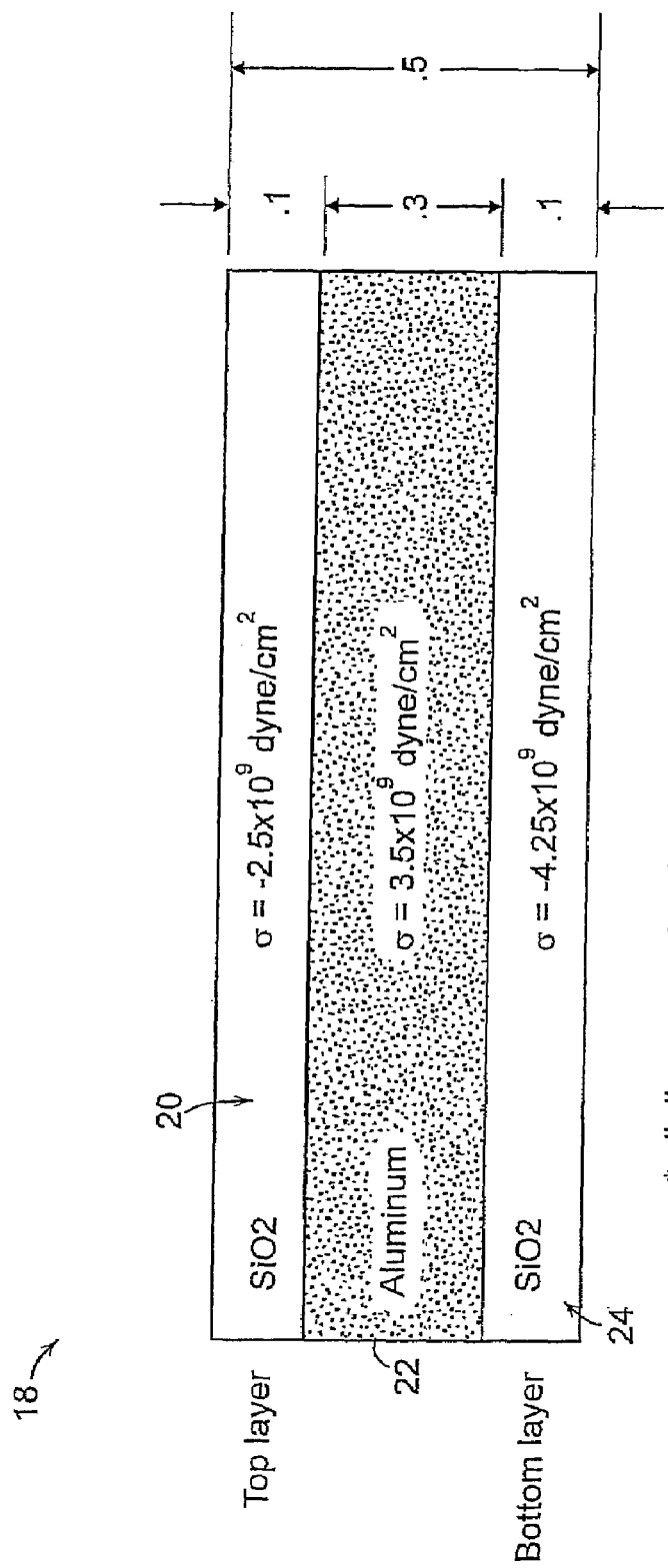
FIG. 2 is a detailed schematic of a membrane used in accordance with the invention.

FIG. 2 is a detailed schematic of a membrane 18 used in accordance with the invention. The membrane 18 includes a top layer 20, a middle layer 22, and a bottom layer 24. The top layer 20 comprises silicon dioxide having a stress of $-2.5 \times 10^9$ dyne/cm$^2$, and is sized at 0.1 µm. The middle layer 22 comprises aluminum having a stress of $3.5 \times 10^9$ dyne/cm$^2$, and is sized at 0.3 µm. The bottom layer 24 is comprised of silicon dioxide having a stress of $-4.25 \times 10^9$ dyne/cm$^2$, and is sized at 0.1 µm. However, certain embodiments may not require the use of the top 20 and bottom 24 layers. Under these circumstances, other modifications to the switch are used to compensate for the removal of the top 20 and bottom 24 layers, which will be discussed more hereinafter. The thickness of the membrane 18, in this embodiment, is approximately 0.5 µm. This value is also permitted to vary in other embodiments.

Furthermore, the threshold voltage applied to the membrane 18 can be adjusted by varying the amount of curl in the membrane 18, which is controlled by the stress in the top 20 and bottom 24 layers and by varying the thickness of the membrane 18.

Figure 3A:
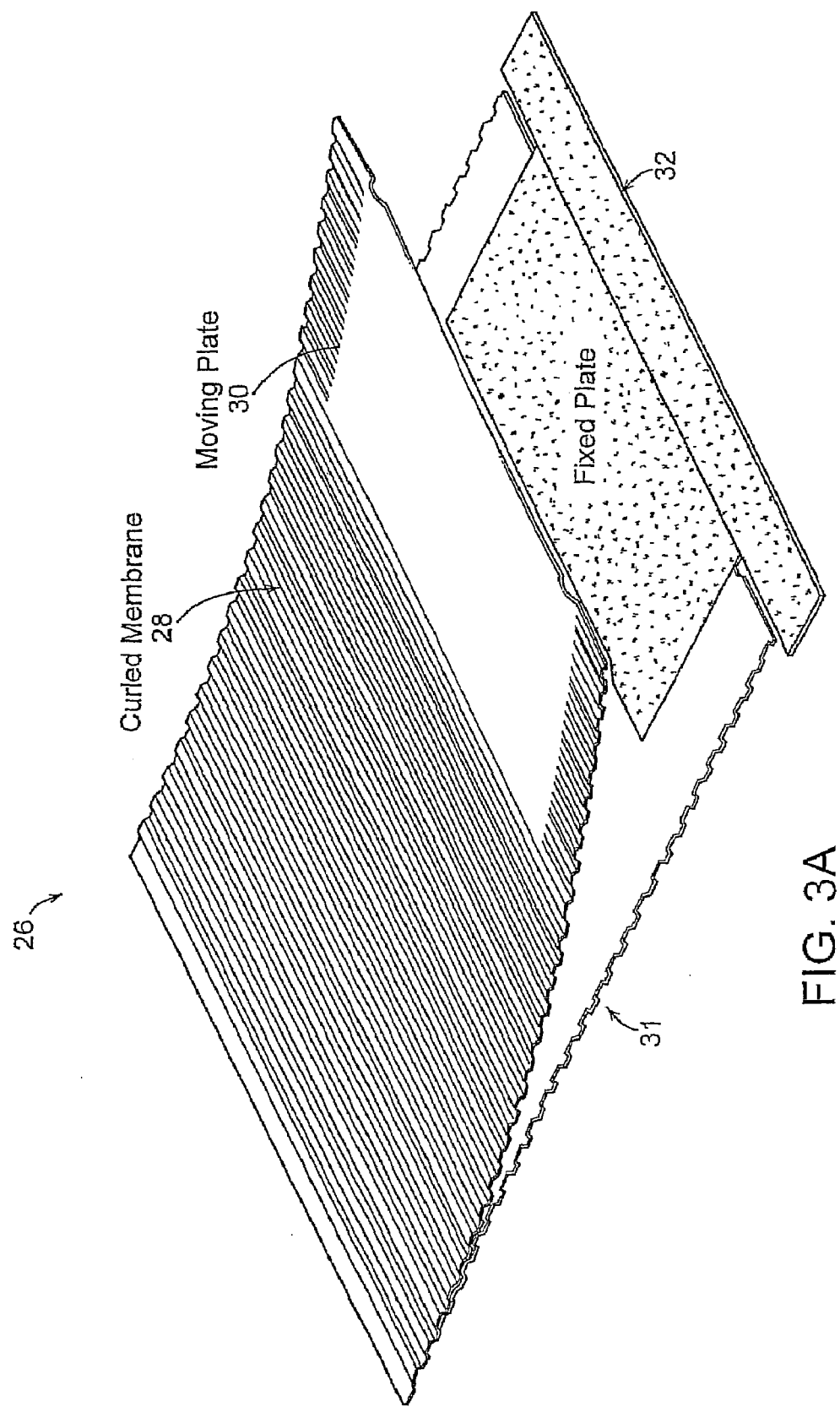
FIGS. 3A–3B are schematics of an RF capacitive switch having a one-finger design used in accordance with the invention.
Figure 3B:
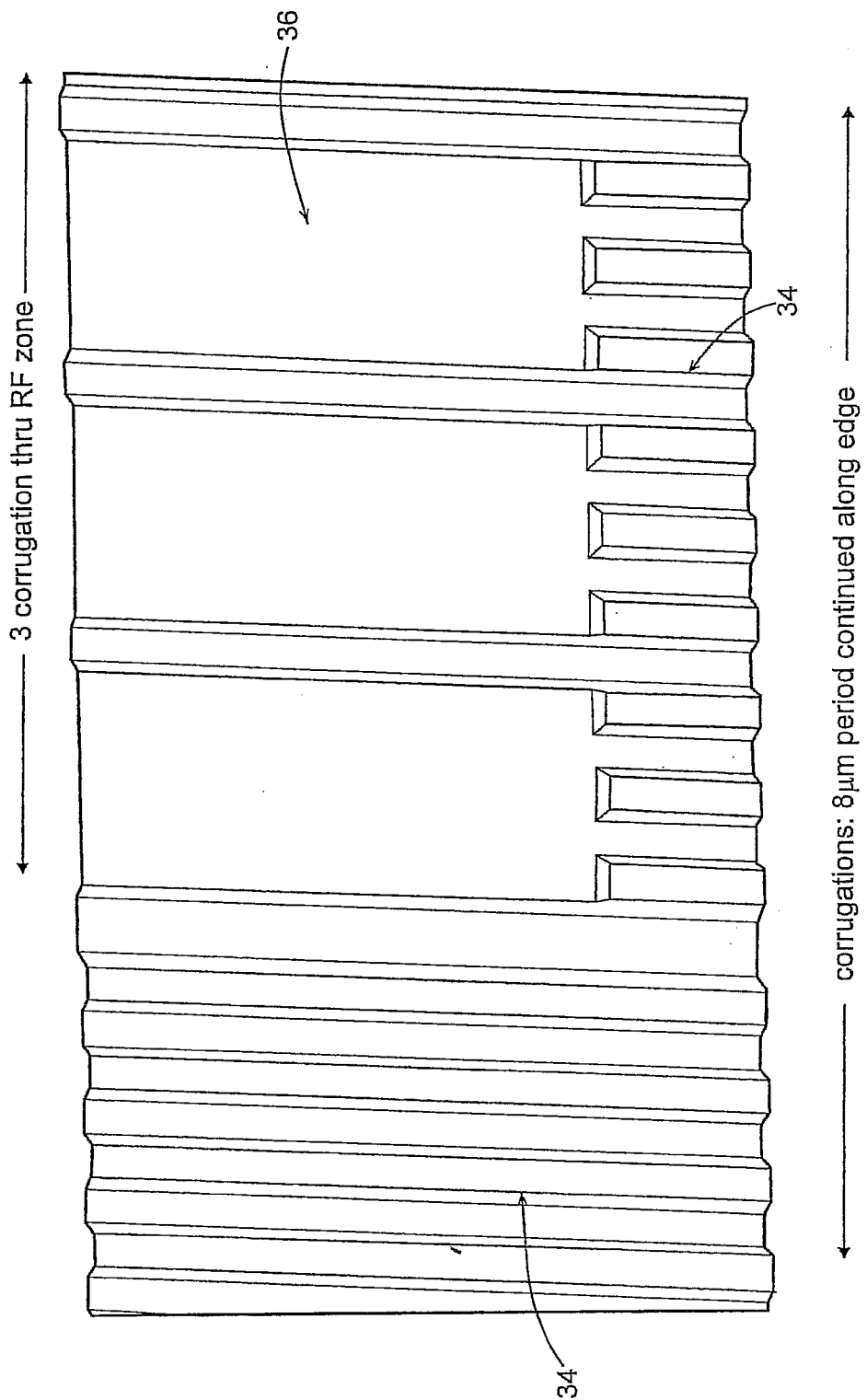

FIGS. 3A–3B are schematics of an RF capacitive switch 26 having a one-finger design used in accordance with the invention. FIG. 3A shows a capacitive switch 26 that includes a curled membrane 28 comprising the materials described in FIG. 2. Moreover, the capacitive switch 26 includes a moving plate 30 also comprised of the materials of FIG. 2 and a fixed plate electrode 32 that is comprised of aluminum with an optional layer of silicon dioxide over it. The contact between the fixed electrode 32 and the moving plate 30 produces the overall capacitance in the switch 26. Both the moving plate 30 and fixed electrode 32 are charged with a particular voltage source, which is not shown for clarity.

The moving plate 30 in FIG. 3A can be designed to have to a particular geometric arrangement. In this embodiment, the moving plate 30 is designed to be a one-finger design. The one finger design implies that a single fixed electrode 32 and plate 30 are surrounded on three sides by the pull down electrode and the corrugations respectively. The electric field between the pull down electrode 31 and the corrugated membrane 28 and between the fixed 32 and moving plate 30 create the force necessary to establish contact between the moving 30 and fixed 32 plates. In other embodiments, there can be designs having more than one-finger in the moving plate 30. For example, a moving plate 30 can have a two-finger design, which implies that two plates are used to form a capacitive switch where there could be corrugations between the plates. Furthermore, these extra corrugations can be designed into the moving plate 30 and combined with a corresponding pull down electrode to provide more efficient contact with the fixed electrode 32.

An important feature of this design is that by having the fixed and moving plates surrounded on three sides by the pull down electrode and corrugations respectively, the moving and fixed plates are brought into intimate contact without necessarily having to apply a voltage between the two plates. In this design the fixed plate is quite flat while the moving plate tends to be flexable and slightly curved in a slight bowl shape with the bottom of the bowl touching first during actuation. By having the surrounding pullin field the moving plate is flattened against the fixed plate.

FIG. 3B shows a more detailed section of FIG. 3A and the corrugations in the membrane 33. The membrane 33 includes two sets of corrugations, such as the plate corrugations 36 and the standard corrugations 34. The standard corrugations 34 are formed in the membrane 33 using standard prior art techniques. In this embodiment, the standard corrugations 34 are 8 µm in period. However, the period for the standard corrugations 34 can vary for different embodiments. The plate corrugations 36 are formed on the moving plate 35. In this case, FIG. 3B shows 3 plate corrugations 36, however, that number can vary in other embodiments. The length and width of the corrugations along with the size of the plate and the oxide thickness determines the amount of capacitance in the switch. Also, the plate corrugations 36 do not necessarily cover the entire width of the membrane 33, usually a selective portion of the width. The standard corrugations 34 cover the entire width of the membrane 33 and portions of the width not covered by the plate corrugations 36.

In all one-finger designs, the fixed plate electrode of a switch is surrounded on at least three sides by a membrane and pull-down electrodes. This geometry can be designed so that the pull down voltage is sufficient to provide enough pressure at the edges so that a membrane is kept flat across a fixed plate electrode without having to apply a voltage between the fixed and moving plates.

Figure 3C:
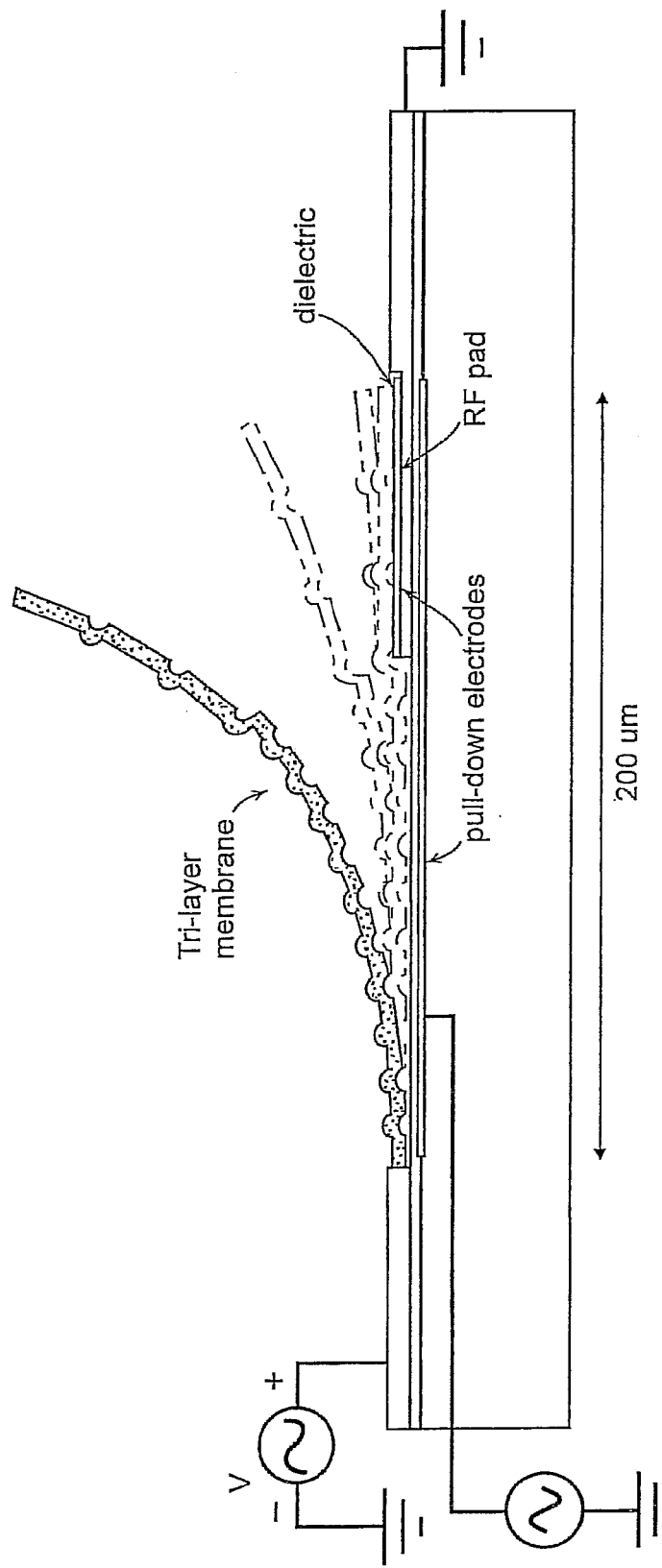

In the prior art, the pull-down voltage was applied to both the pull down electrodes and to the fixed electrode relative to the membrane. This was necessary for intimate contact between a fixed electrode and moving plate, and maximizing the closed-state capacitance. The theory is that high fields between a fixed plate electrode and moving plate slowly breaks down the insulator, builds up charge, which causes stiction. The one-finger capacitance switches have the feature that a membrane can be pulled flat using a reduced DC voltage applied between a fixed plate electrode and moving plate of the capacitor. By having no voltage or perhaps a very low voltage between a fixed electrode and moving plate, the field-induced stiction should be eliminated or greatly reduced. FIG. 3C shows a lengthwise cross section of a switch where the actuation of the switch is simulated.

FIG. 3C is a cross sectional drawing of one embodiment off the capacitive switch using the membrane of FIG. 3A and 3B. FIG. 3C is a stop action simulation of the switch membrane during the switching action.

FIGS. 4A–4B are schematics of another embodiment of the inventive capacitive switch 38. FIG. 4A shows the top view of the capacitive switch 38. For purposes of illustration, FIG. 4A illustrates the use of carbonized resists 40 throughout the capacitive switch 38 during fabrication. The carbonized resists 40 are used to form the corrugations on the membrane 39. These resists 40 in this embodiment are sized at 1 μm thick and 5 microns wide, and one can refer to resists 40 as "thick", and are removed after release from the membrane 39. The corrugations could also be formed using other materials such as molybdenum instead of carbonized resist. The capacitive switch also includes a moving plate 42 having three plate corrugations 44. The plate corrugations 44 rest on a fixed plate 50 before release. Note that the switch has a one-finger design. It also incorporates the advantages described in FIGS. 3A–3B regarding a one-finger capacitive switch.

FIG. 4B is a cross-sectional view of the capacitive device 38, which is shown after release in its closed or rolled out position. A slight gap is shown between the membrane and the substrate and fixed plate for clarity. In actual operation the membrane contacts the fixed surface over significant areas. The membrane 39 includes a layer of silicon dioxide sized at 100 nm thick, aluminum sized at 300 nm thick, and silicon dioxide sized at 100 nm thick. Note that FIG. 4B assumes that the carbonized resists are removed. Also, the capacitive switch 38 includes bottom pull-down electrodes 48. These electrodes 48 are high resistance to make them transparent to RF and are made from tantalum nitride and are contained in the oxide layer 52 of the capacitive device 38. Moreover, the pull-down electrodes 48 are continuous and provide the necessary potential to pull, or actuate, the membrane 39 down onto the fixed oxide surface and onto the fixed plate 50. In this embodiment, the fixed plate 50 is comprised of aluminum. However, the fixed plate 50 can be comprised of other materials, such as gold or copper. The capacitive switch 38 includes a pull-back region 46 where electrode 48 is not present. The pull-back region is sized to control the threshold voltage for actuation of the membrane.

FIGS. 5A–5B are schematics of a third embodiment of the inventive capacitive switch 54. FIG. 5A shows the top view of the capacitive switch 54 which is the same as FIG.4A except for the pull down electrode 64. In this embodiment the pull down electrode 64 is segmented to form strips lying under the resist corrugations, all the strips 64 being connected together at the top and bottom edges. The pull down electrode strips 64 beside the plate region are short and do not cross under the fixed plate, and end just short of the plate.

FIG. 5B is a cross-sectional view of the capacitive device 54, which is the same as FIG. 4B except for the pull down electrode 64. The membrane 55 includes a layer of silicon dioxide sized at 100 nm, aluminum sized at 300 nm, and silicon dioxide sized at 100 μm. Note that FIG. 5B assumes that the carbonized resists are removed. The capacitive switch 54 includes a pull-back region 62 that does not include any pull down electrodes. The segmented pull down electrode is shown in cross section. In this embodiment the pull down electrode 64 is closer to the surface than the pull down electrode 48 is FIG. 4B. The pull down electrode 64 could also be on the surface without any oxide covering. The design of the strips of the pull down electrode is to make their width substantially less than the width of and centered to the corrugations. When the membrane bottom surface comes in contact with the top surface of the substrate there will be an air gap between the bottom electrode strips and the membrane electrode. This air gap can help to reduce stiction.

It should be noted here that the plate electrode is shown to be rectangular and has square corners. The plate in these designs could be nonrectangular and have rounded corners, and indeed could be generally round if desired, perhaps reducing the RF losses.

Figure 6A:
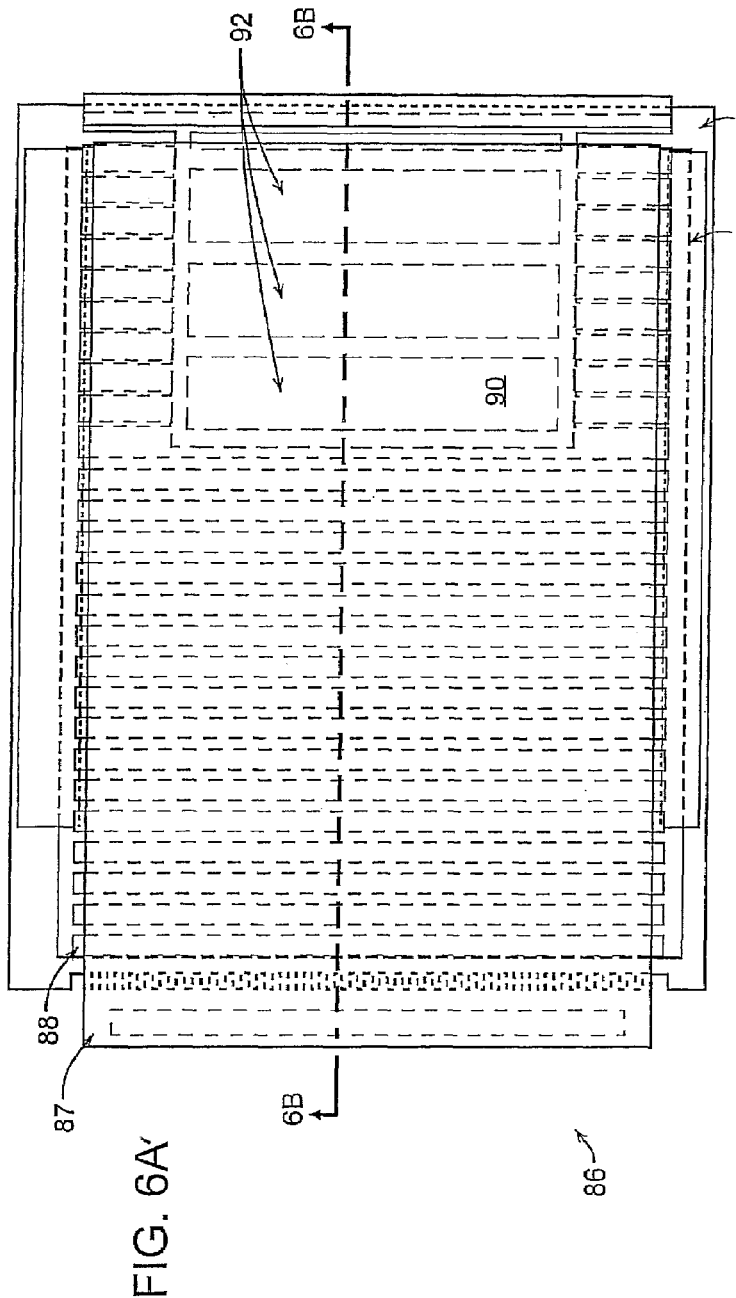
FIG. 6A–6B are schematics of a fourth embodiment of the inventive capacitive switch.
Figure 6B:
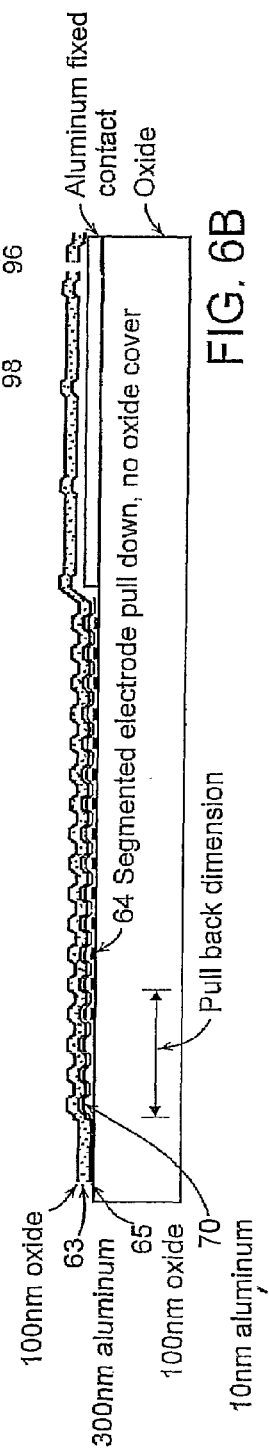

FIG. 6 is a schematic of a fifth embodiment of the inventive capacitive switch 86. FIG. 6 shows the top view of the capacitive switch 86 having a one-finger design. This device has the same description as the device of FIGS. 5A&B except for an additional electrode 70. This additional electrode 70 covers the bottom surface of the membrane 87 everywhere except in the area of the plate. The membrane 87 now has two electrodes one 63 on top of the other 66 separated by and oxide layer 65 which insulates the two layers 63, 66. This additional electrode 70 is used together with the pull down electrode 64 to actuate the switch 86. The switch 86 has a total of four electrodes 63, 65, 70, and 64, two thicker ones for RF conduction and two thinner layers for actuation. Therefore, the switch 86 is a four terminal device where the actuation electrodes are separated from the RF electrodes.

The membrane 87 includes a layer of silicon dioxide sized at 100 nm, aluminum sized at 300 nm, and silicon dioxide sized at 100 nm. There is an ultra thin layer of aluminum below the 100 μm layer of silicon dioxide to form the additional electrode 70. Other materials could be used instead of the ultra thin aluminum such as tantalum nitride. Tantalum nitride could also be used for the pull down electrode for any of the embodiments described. In another embodiment one could extend the thin electrode 70 and the pull down electrode 64 over the plate region to provide better contact in the plate region when the switch is actuated.

The ultra-thin layer 70 of aluminum can be used for pull-down electrodes and for routing signals in an x-y device array. This ultra-thin layer 70 connects out through the region where the membrane attaches to the substrate, and connects to either the bottom or top electrode high resistance layers, where it is isolated from the RF signal. Furthermore, the ultra-thin aluminum layer provides a way to do the x-y addressing required in some switch array applications.

Figure 7:
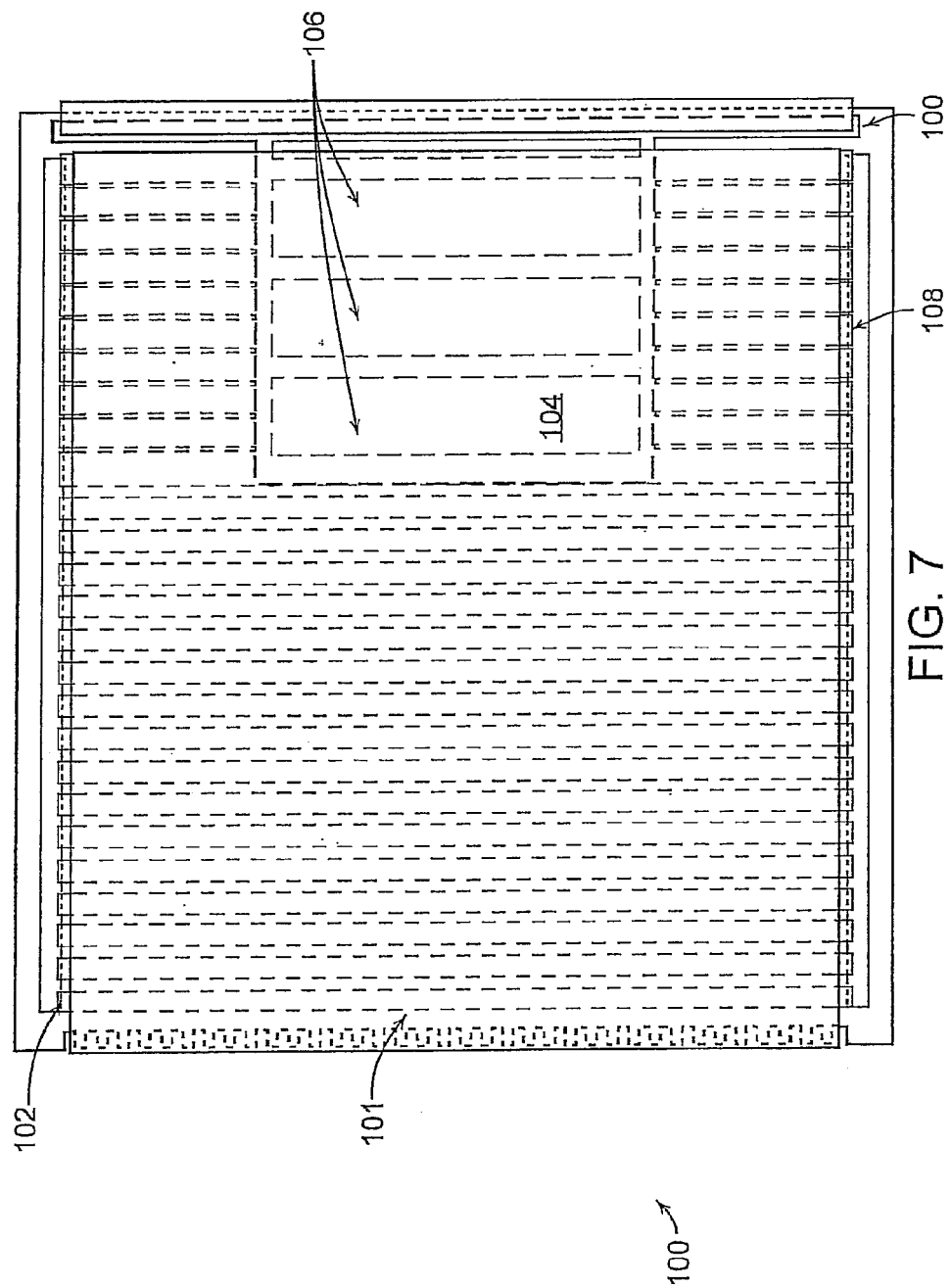
FIG. 7 is a schematic of a fifth embodiment of the inventive capacitive switch.

FIG. 7 is an additional embodiment of the capacitive switch 100. This switch 100 is like the one finger design of FIG. 6B except that the membrane has the aluminum conductor removed in two strips, or cuts 101, separating the moving electrode into three electrodes. Only the aluminum part of the membranes is cut so that the silicon dioxide part of the membrane still connects. The side electrodes, which during operation would be connected together electrically externally, together with the pull down electrode, provide the force to bring the moving plate into contact with fixed capacitor plate. By providing the cuts, and connecting together the side electrodes, once again as in FIG. 6 a 4 terminal device results. A four terminal device has the advantage that no additional bias connections to the RF lines are necessary.

Figure 8:
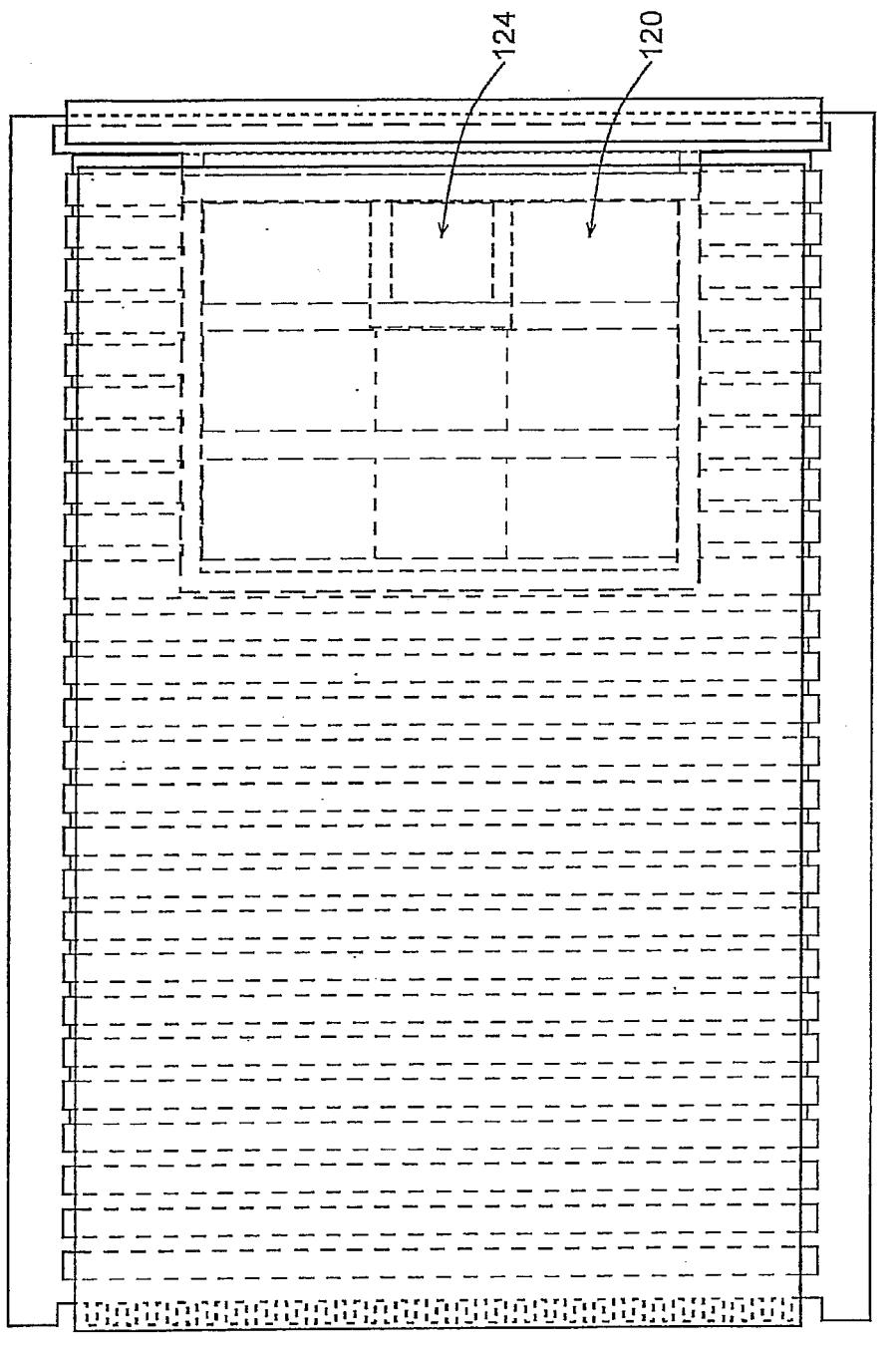
FIG. 8 is a schematic of a sixth embodiment of an inventive capacitive switch.

FIG. 8 is a schematic of a fifth embodiment of an inventive capacitive 112 switch. FIG. 8 shows the top view of the capacitive switch 112 having a one-finger design. This design is the same as the first embodiment, FIG. 4A, except that there is a latch added at the end of the cantilever. The latch is created by having a hole or slot 124 at the far end of the plate 120 and the pull down electrode is placed in this opening. The pull down electrode provides extra force at the end of the cantilever holding it down with a lower voltage. There are a wide variety of possible latch designs, for example the opening could be wider or narrower, there could be several openings etc.

Figure 9:
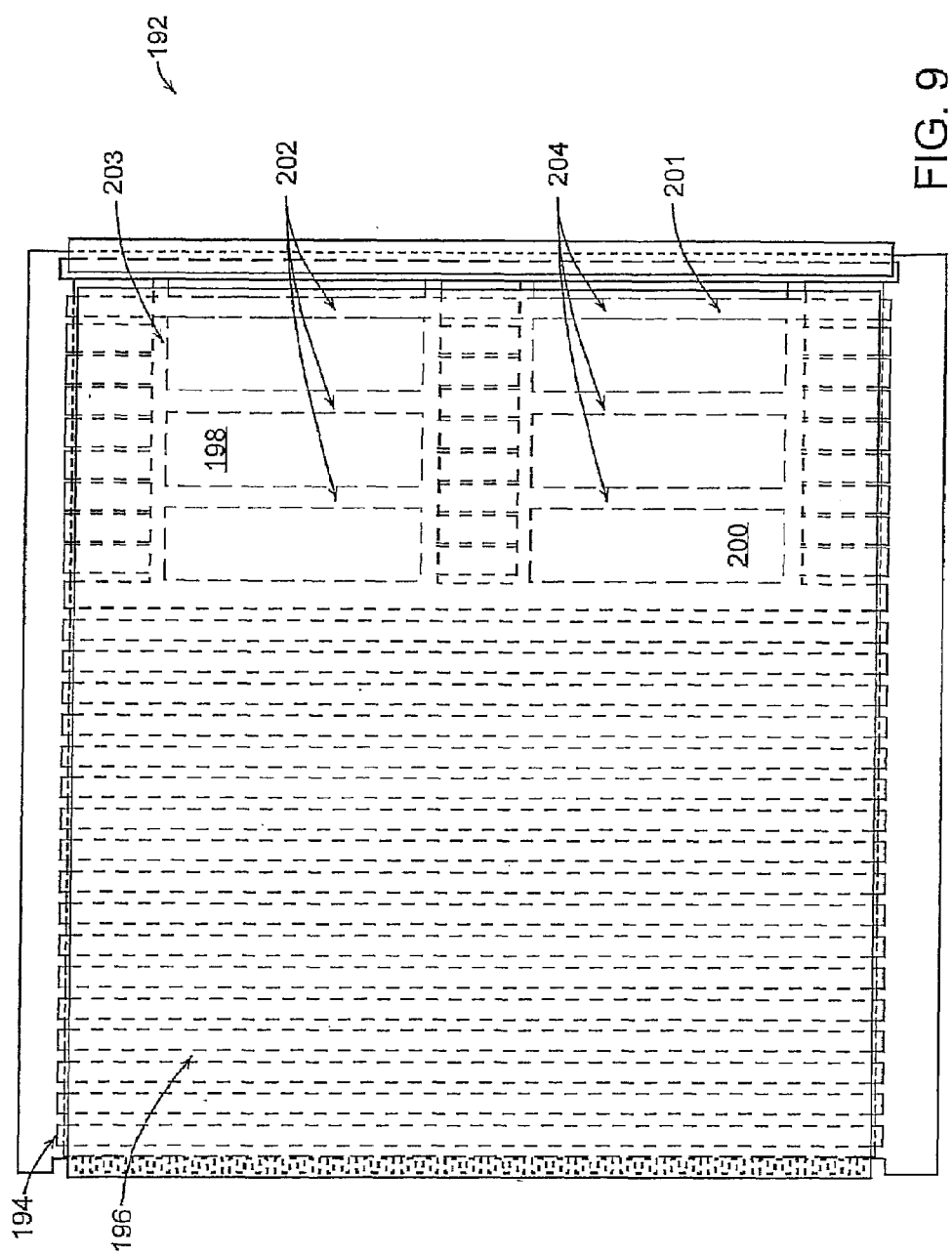
FIG. 9 is a schematic of a seventh embodiment of an inventive capacitive switch

FIG. 9 is a schematic of a fourth embodiment of the inventive two-finger capacitive switch 192. FIG. 9 shows the top view of the capacitive switch 192 having a two-finger design. This embodiment is very similar to FIG. 4A except that it has two fingers. For purposes of illustration, the carbonized resists 194 are used to form the corrugation on the membrane. These resists 194 are sized at 1 µm thick, and are removed after release from the membrane 196. The capacitive switch also includes a moving plate 197 having two fingers 198, 200, where each finger 198, 200 has a set of 3-RF zone corrugations 202, 204. The two fingers rest on a fixed plate electrode 196, and each includes a thin layer of resist on its sides 201, 203. Furthermore, a significantly large distance separates the fingers 198, 200. The range distance between fingers could be from one micron to hundreds of microns.

The membrane includes 196, a layer of silicon dioxide, sized at 100 nm, aluminum sized at 300 nm, and silicon dioxide sized at 100 nm. Also, the capacitive switch 192 includes bottom pull-down electrodes, which are positioned below the oxide layer 195 of the capacitive device 192. Moreover, these pull-down electrodes are continuous and provide the necessary potential to pull the membrane 196 on the fixed plate electrode 193.

Figure 10:
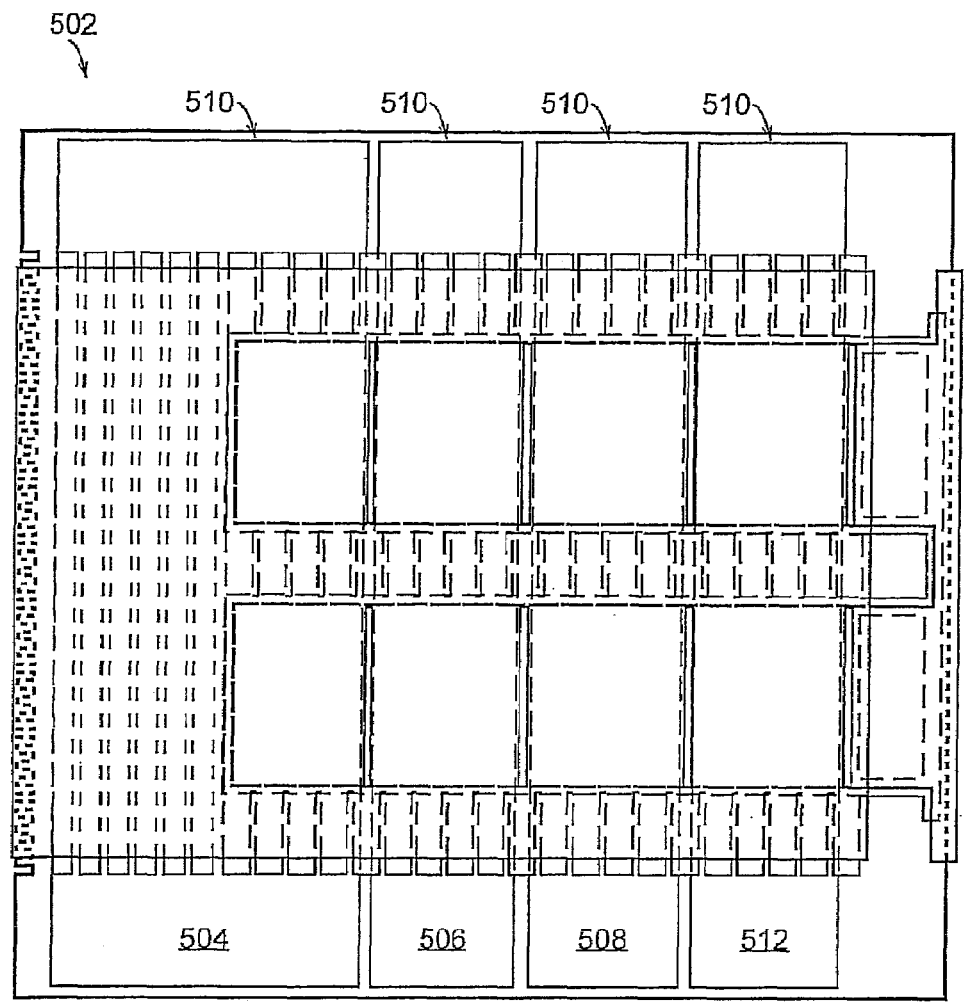
FIG. 10 is a schematic of a fourth embodiment of the inventive two-finger capacitive switch.

FIG. 10 is a schematic of a varactor 502 formed in accordance with the invention. The varactor 502 is similar to the two finger capacitive device of FIG. 10 except that it includes several segmented pull-down electrodes 510 which are connected to separate voltage sources and can be arranged to pull the membrane down to the surface of the substrate in stages. With the voltage applied to the first electrode 504 the cantilever moves to contact the first electrode and therefore increases the capacitance by a specified a amount. The second 506, third 508, and fourth 512 electrodes similarly can be used to increase the capacitance in steps, hence a varactor 502. In other designs one could have a different number of electrodes where the membrane design is adjusted accordingly to provide a finer or courser capacitance variation with voltage. By adjusting the voltages it is possible to create an analog variation of capacitance with voltage.

Figure 11:
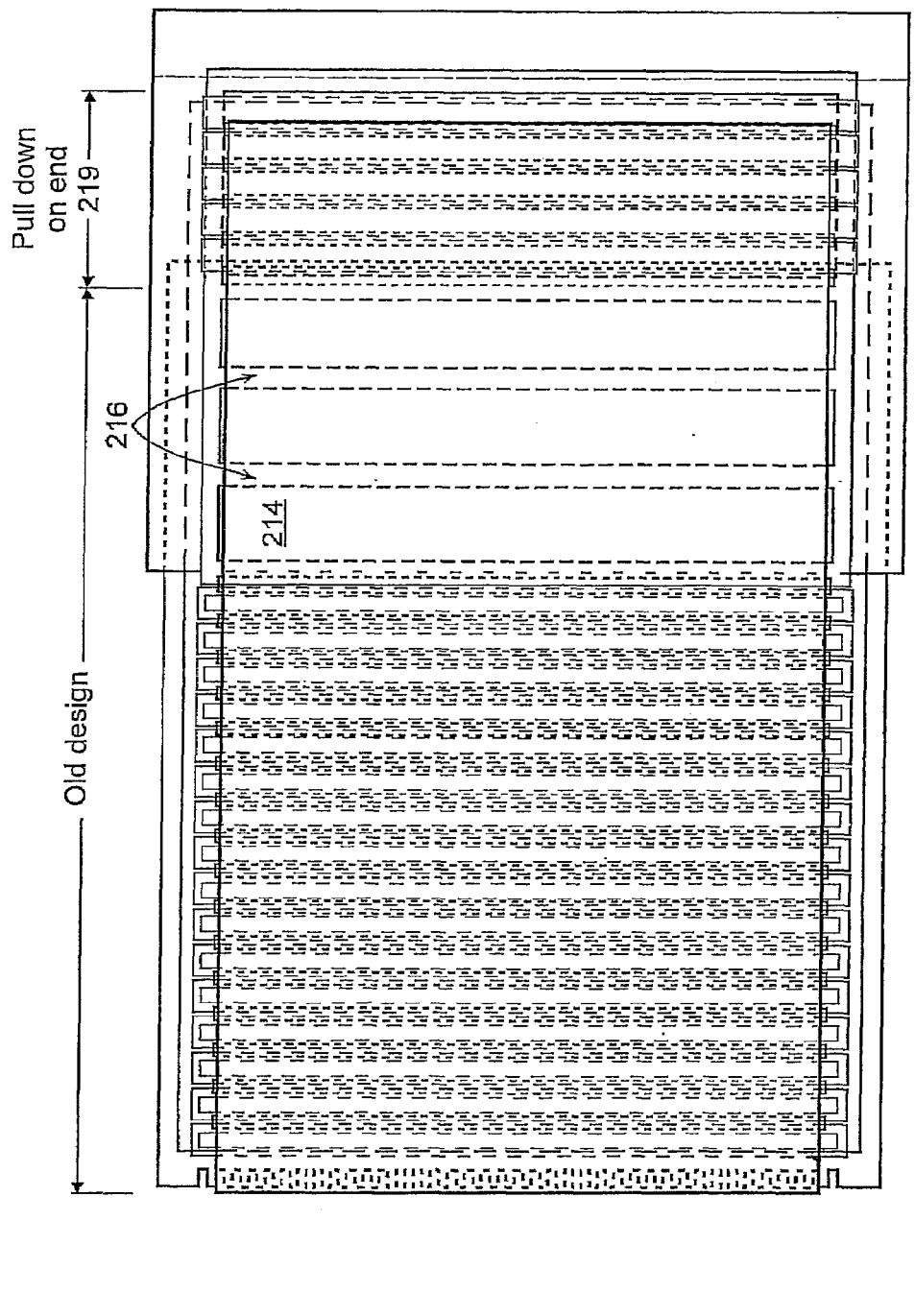
FIG. 11 is a schematic of a varactor formed in accordance with the invention.

FIG. 11 is a schematic of an additional embodiment of a capacitive switch 210 having an additional pull-down electrode on its end, which one can call the latch. The capacitive switch 210 includes a moving plate 214 having a one-finger design, where the one finger 210 includes plate corrugations 216 in the membrane as in earlier embodiments. However in this case the corrugations begin again at the end of the plate and there are no corrugations along the sides of the plate.

Having a pull down electrode 219 in switch 210 at the end of the cantilever membrane has the advantage of requiring a somewhat lower voltage to hold the membrane in the rolled out position compared with previous designs. This latch structure could also be combined within the other designs described herein for example a latch could be incorporated into the switch of FIG. 5 at the moving end of the cantilever.

Figure 12A:
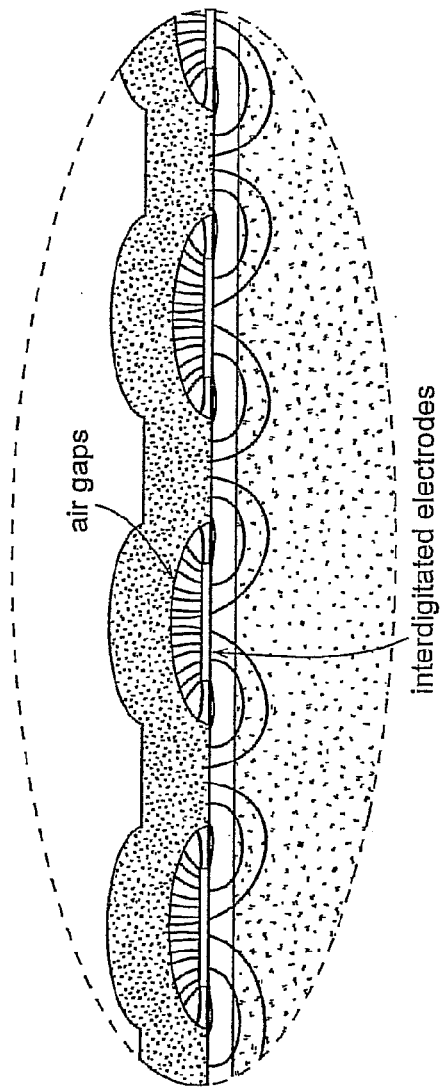
FIG. 12 is a schematic of a capacitive switch having its pull-down electrodes on its end.
Figure 12:
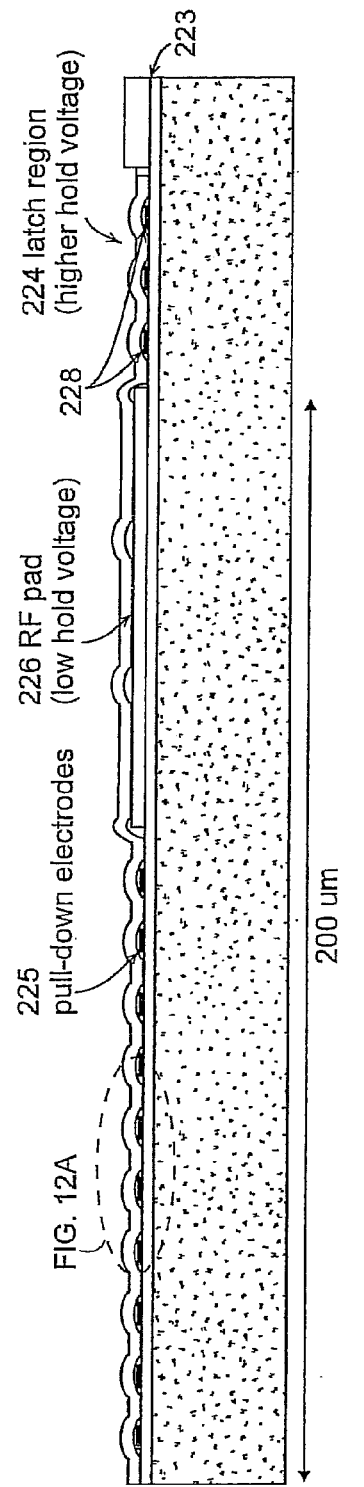

FIG. 12 is a cross sectional schematic of the capacitive switch 210 having pull-down electrodes 228 on its end. In this embodiment, the segmented pull-down electrodes 228, 225 are placed above the oxide layer 223 of the switch 222. The switch 222 is broken up into three regions, the latch region 224, RF pad or fixed plate electrode 226, and pull-down electrodes 228. The voltage for the pull down and the latch regions can be the same so they can be connected together to form one electrode. A small voltage and can be optionally applied between the plates to provide more intimate contact and a higher capacitance.

Figure 13:
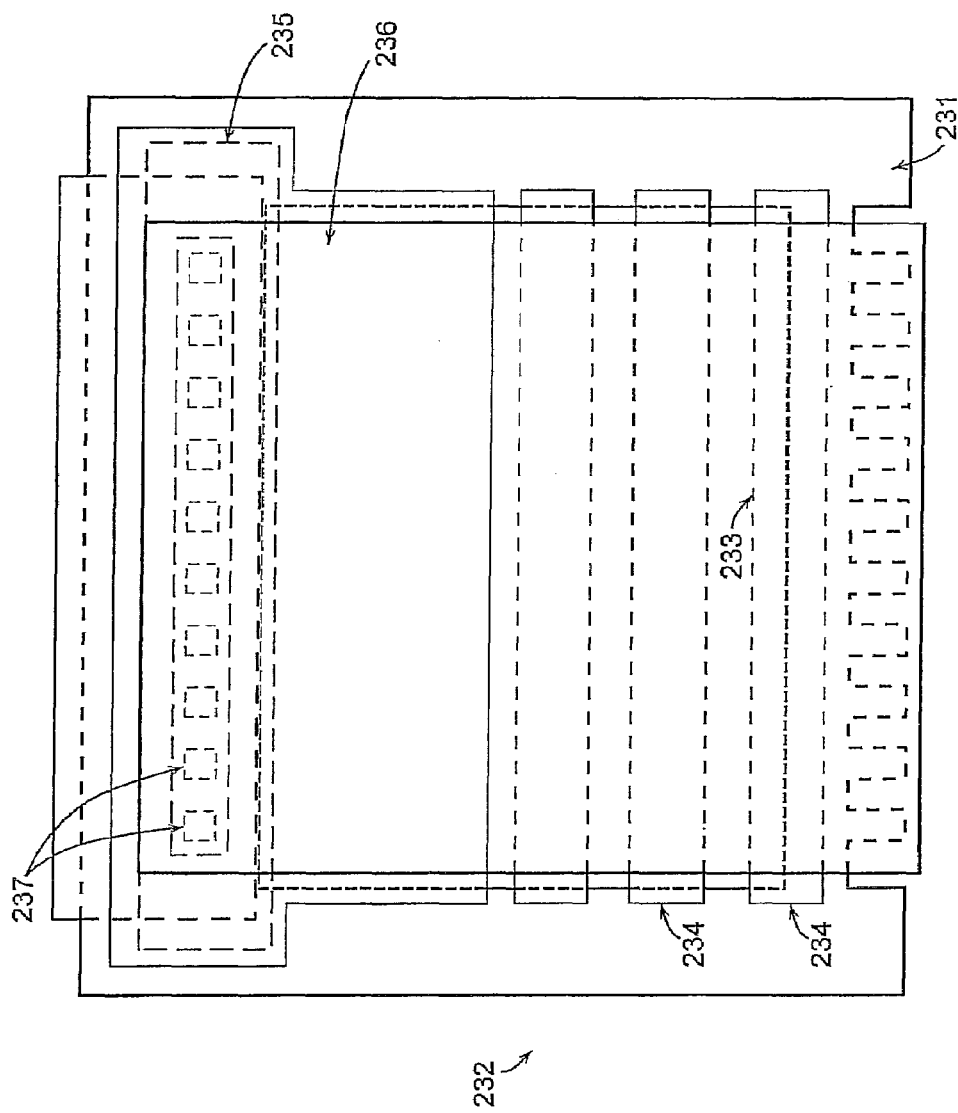
FIG. 13 is a detailed schematic of the operations of the capacitive switch having its pull-down electrodes on its end.

FIG. 13 is a schematic of an embodiment of a DC switch 232. FIG. 13 shows the top view of the DC switch 232 which includes a moving membrane having a plate at the end. The plate contains the contact dimples. The switch also includes the fixed contact directly under the moving plate. For purposes of illustration, FIG. 13 illustrates the use of carbonized resists 234 throughout the DC switch 232 during fabrications. The carbonized resists 234 are used to form the corrugations on the membrane 233. These resists are sized at 1 µm thick, and are removed after release from the membrane 233. Other materials could be used instead of the carbonized resist such a molybdenum. Furthermore, the moving plate 236 includes raised and depressed regions that form dimples 237. These dimples 237 are used to provide the electrical contact between the membrane 233 and fixed plate electrode 235, and the size and number, along with the plate area, will effect the contact force and contact area which will be described more below. The contact resistance with the switch closed will generally be smaller if there is a larger number of contacts and if there is a larger force holding the contacts together. The larger force can be brought about using a larger voltage, resulting in a larger electric field, and a larger membrane pull down area around the contacts.

The membrane 233 includes a layer of silicon dioxide sized at 100 nm, aluminum sized at 300 nm, and silicon dioxide sized at 100 nm. There is a thin layer of platinum at the bottom of the dimples and also on the top of the fixed plate in the contact area. With the switch pulled down the two platinum surfaces provide the electrical contact. The platinum is a good contact material because it does not easily form an insulating oxide which can interfere with current conduction between the contacts. Other materials could be used instead of platinum, such as gold or iridium or ruthenium or rhenium or palladium etc. or alloys of these materials etc. The DC switch 232 can include a small pull-back region. Also, the DC switch 232 includes a pull-down electrode, which is positioned below the oxide layer 231 between the membrane contact edge and the fixed contact 232. Moreover, this pull-down electrode is continuous and provides the necessary potential to pull the membrane 233 on the fixed plate electrode 235. Of course the pull down electrode could also be segmented as was described for the capacitive switch.

Figure 14:
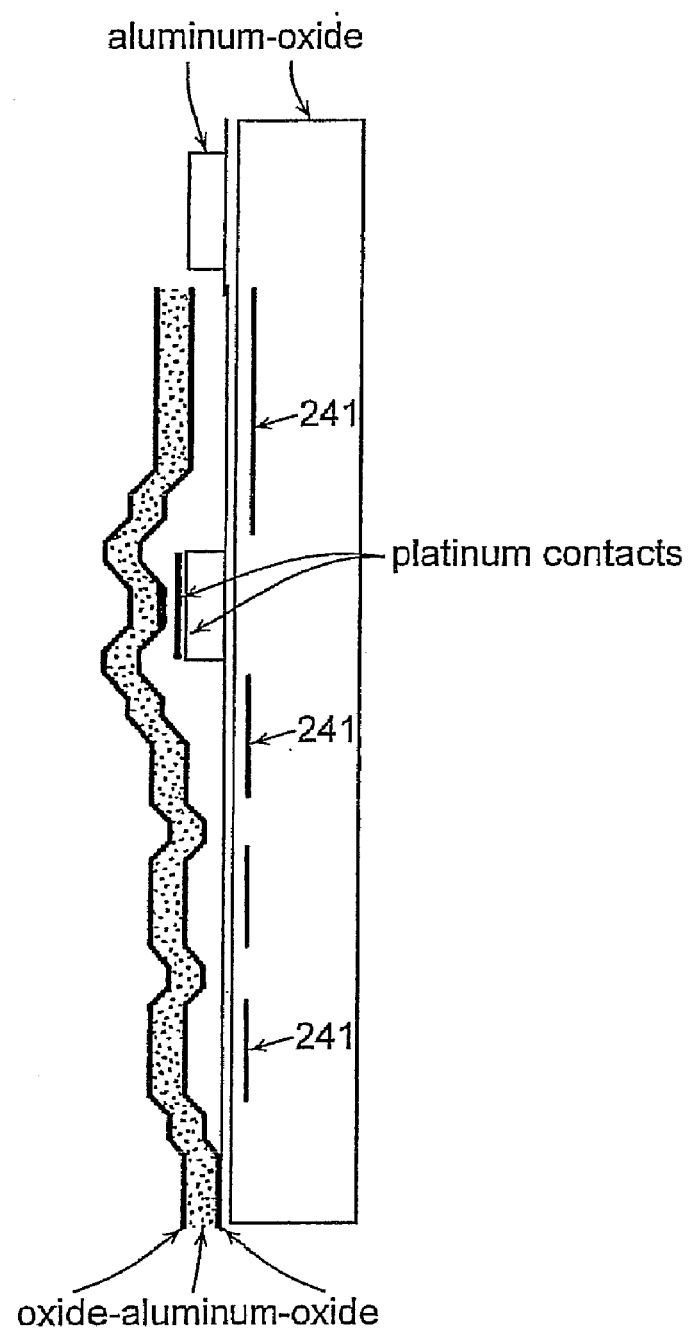
FIG. 14 is a schematic of a DC switch.

FIG. 14 is a schematic diagram of another embodiment of a DC switch 238 formed in accordance with the invention. FIG. 14 shows a cross-sectional view of the DC switch 238. This switch has a similar design for the membrane 233 and with dimples 237 similar to the previous embodiment. In this case however the pull down electrode 241 is formed on two sides of the dimples. The advantage of this geometry is that it is possible to have a greater force on the contacts with the same or lower hold down voltage.

Figure 15:
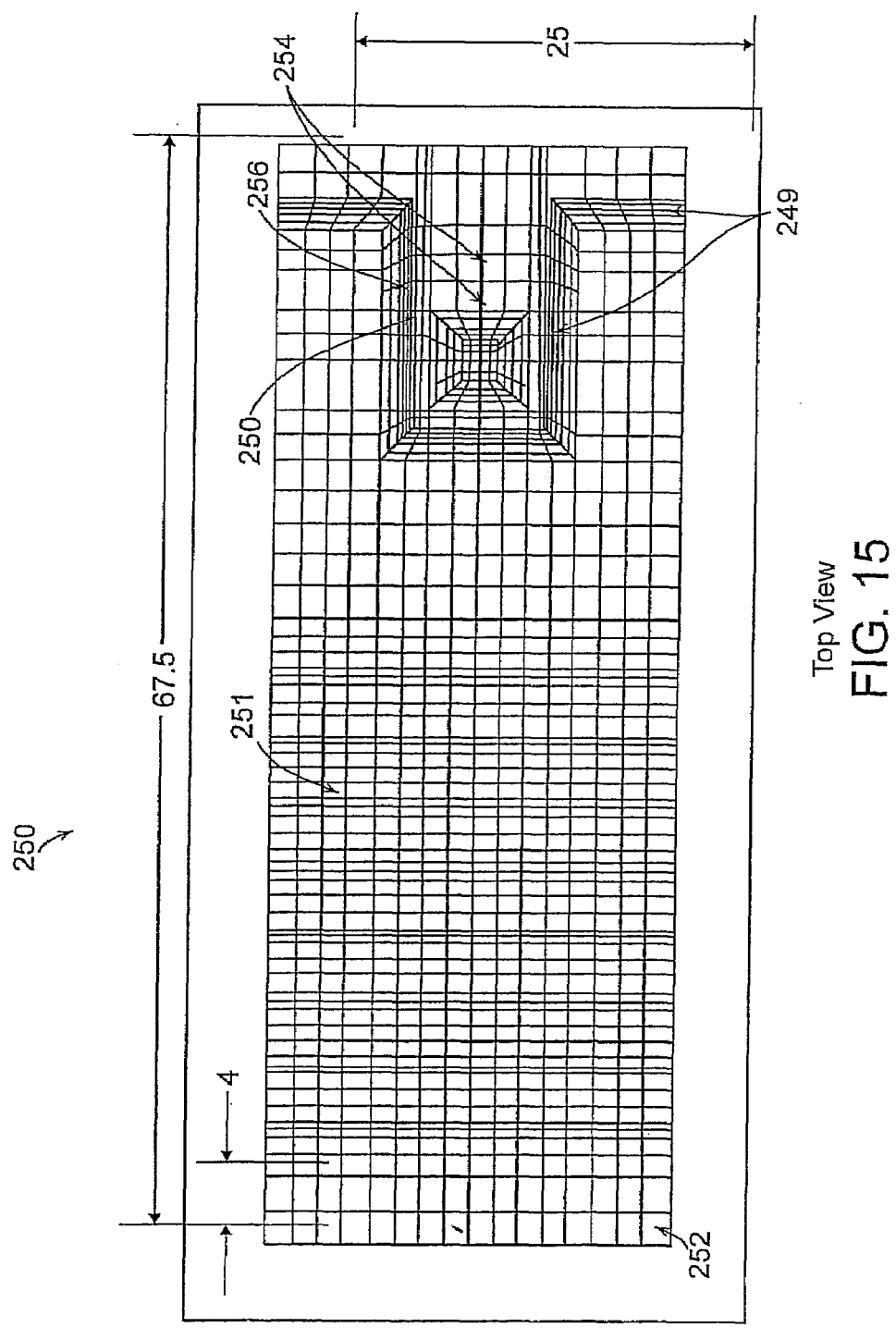
FIG. 15 are schematics of another embodiment of a DC switch formed in accordance with the invention.

FIG. 15 is a schematic diagram of an additional embodiment of the DC switch with the detail of the dimple and the finger electrode described herein. FIG. 15 shows a top view of an exemplary switch, showing a dimple 254 described in FIG. 15. There is a finger structure 250 etched into the plate during fabrication which forms around the fixed contact 249 sitting on the surface. The dimple 254 is embossed directly in top of the fixed contact 249 on the moving plate finger 256 which is directly on top of the fixed plate finger 250 of a DC switch. The length of the finger of the moving plate is 20 µm. In addition, the width of the membrane is 25 µm. The overall length of the membrane 251 between the edge of attachment 252 and the end is 67.5 microns.

The fabrication can be arranged however so that the fixed contact 250 is embedded in the oxide surface. In this case there would be no visible finger structure in the moving plate 250 and there would only be a dimple. The dimple is in the center over the end of the finger structure of the fixed contact. The pull down electrode is not shown and is placed around the fixed contact finger under the membrane. The size of the dimple is 2 microns in diameter and could be in the range of 0.1 to 10 microns. The finger length is 10 microns, the width is 6 microns and these dimensions will vary depending on the design and the amount of force to be applied to the contact.

FIGS. 16A–16B are schematics of a DC switch 326 having one finger and dimple. FIG. 16A shows the top view of the DC switch 326, and FIG. 16B shows a cross-sectional view of the same switch 326. The carbonized resists 328 are used to form the corrugations on the membrane 330 and there are four corrugations 333 in the moving plate. These resists 328 are sized at 1 µm thick, and are removed after release from the membrane 330. The DC switch 326 also includes a moving plate 332. In addition, the moving plate 332 is designed with a dimple 334 as described herein. The regions 336 surrounding the dimple 334 are coated with a thin layer of resist for forming the one finger design.

FIG. 16B is a cross-sectional view of the switch 326, which is in its closed position. The membrane 330 includes a layer of silicon dioxide sized at 100 nm, aluminum sized at 300 nm, and silicon dioxide sized at 100 nm. The DC switch 326 includes a pull-back region 338 that does not include any electrodes. Also, the switch 326 includes bottom pull-down electrodes 341 which are positioned below the oxide layer 335 of the switch 326. Moreover, these pull-down electrodes 341 are continuous and provide the necessary potential to pull the moving plate 330 on the fixed plate 340. In this embodiment, the dimple 334 is placed over the fixed plate 340, and also includes a thin platinum contact 329 on its bottom-most portion that comes into contact with the thin platinum contact 327 of the fixed plate 340. Other materials can be used in place of the platinum contacts 327, 329 of the dimple 334 and the fixed plate 340, such as aluminum.

FIGS. 17A–17B are schematics of the DC switch 342 having a one-finger design and three dimples 352, 354, 356. The structure of this switch 342 is similar to that described in FIGS. 16A–16B. However, this switch 342 includes three dimples 352, 354, 356 of which dimple 354 is used to form the one finger design with mechanical and electrical contact, and the other two dimples 352, 356 are used to establish mechanical contact only. Moreover, the switch 342 also includes upper segmented down electrodes 358, which are contained in the oxide layer 362. The modifications done to this switch 342 are consistent with other switches described herein, thus it operates as its counterpart described in FIGS. 16A–16B. The extra mechanical contact dimples 352, 356 in FIGS. 17A–17B provide a stiffer structure after the dimples come into contact allowing the membrane to maintain its gap to the substrate at high electric fields.

The high electric fields and the stiffened structure can be used to apply a larger force to the contact. If the design is such that during actuation the mechanical contact dimples come into contact before metal electrical contact dimple, the force from the electric field must be enough to bend the outer part of the switch membrane between the dimples to make electrical contact. This will reduce the closure contact force somewhat, but will increase the force for opening the electrical contact. This increase in opening force can be useful for reducing stiction. One additional way to stiffen the membrane would be to add a thicker gold plate instead of or in addition to the aluminum plate.

Figure 18:
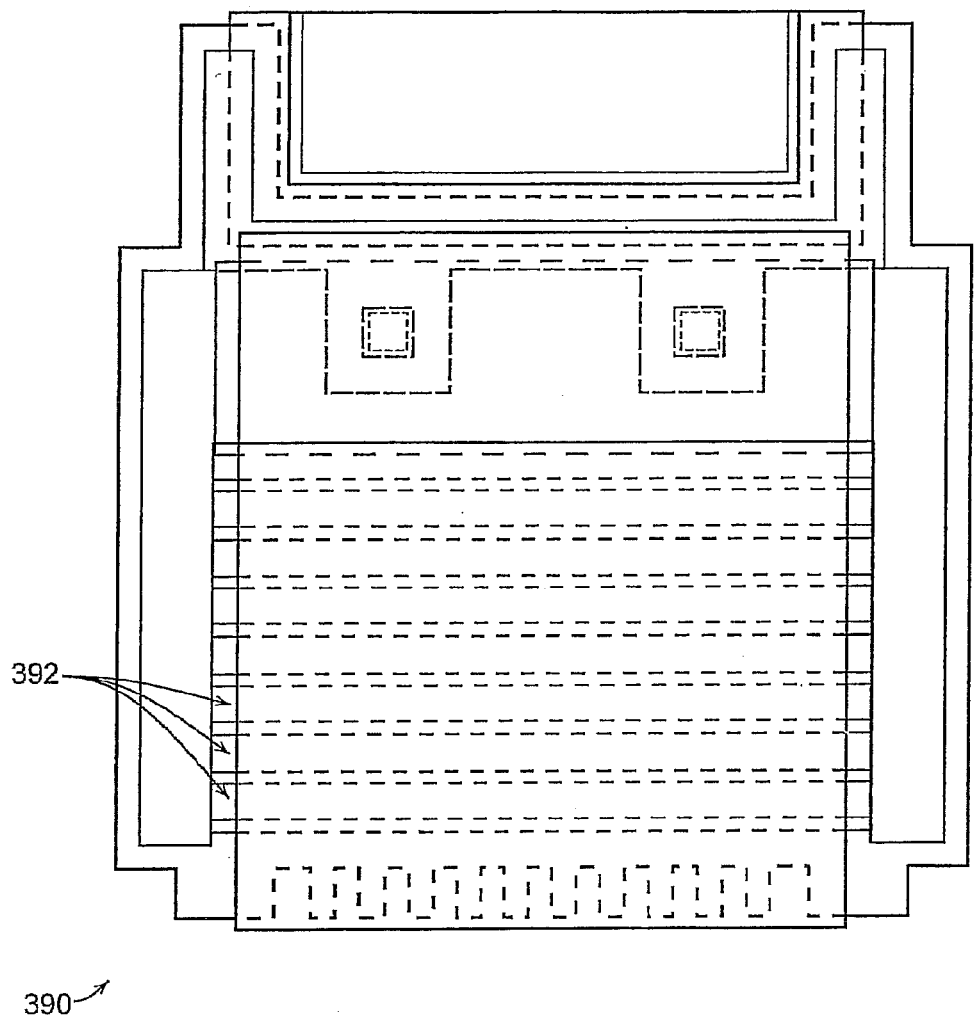
FIG. 18 shows the top view of the DC switch having a one-finger design.

FIG. 18 is a schematic of another embodiment of a DC switch 390 having a two-finger design. Except for the two contacts the switch 390 is similar to that described in FIGS. 17A–17B. However, this switch 390 includes segmented top electrodes 392, which are contained in the oxide layer of the switch 390. This switch will operate similar to those described in FIGS. 15 and 17A–17B. The advantage of two contacts is that they provide a more stable landing avoiding the possible tipping to one side. The mechanical contact dimples and gold plate could be used as a possible enhancement for this design for stiffening the membrane during actuation similar to the effects described in FIGS. 17A–17B.

Figure 19:
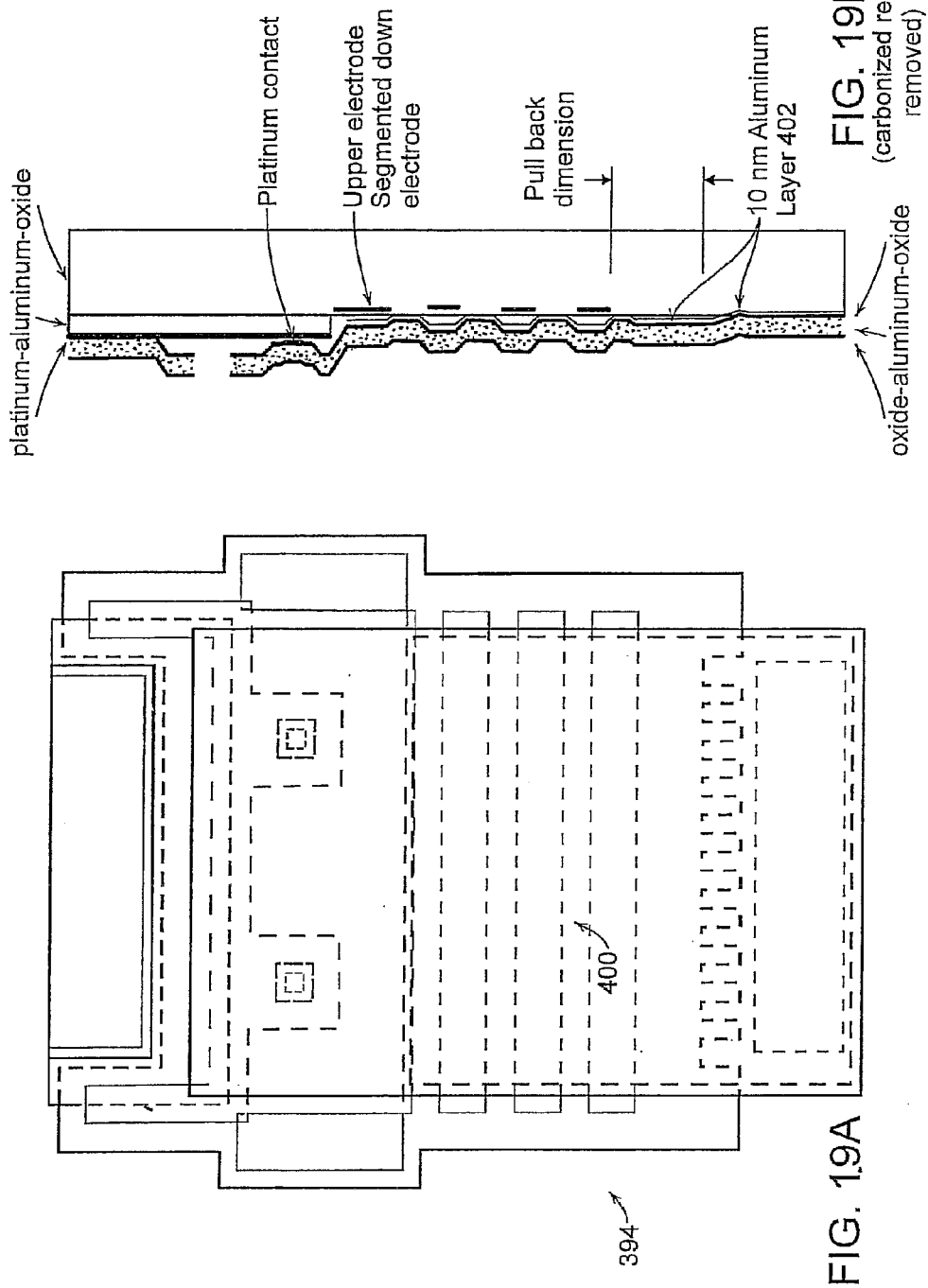
FIG. 19 is a schematic of another embodiment of a DC switch having a two-finger design.

FIGS. 19A & 19B are schematics of a third embodiment of a DC switch 394 having a two-finger design. The switch 394 is similar to that described in FIG. 18. The difference is the cantilever membrane 400 which also includes an ultra-thin layer of aluminum 402 as an additional electrode. The ultra-thin layer can be used for x-y addressing, as described in FIG. 6 for the capacitive switch. The thin aluminum electrode layer can be used together with the pull down electrode, to actuate the switch. This will allow for isolation between the actuation circuit and the RF circuit. The switch in FIG. 19 is a four terminal device.

Figure 20:
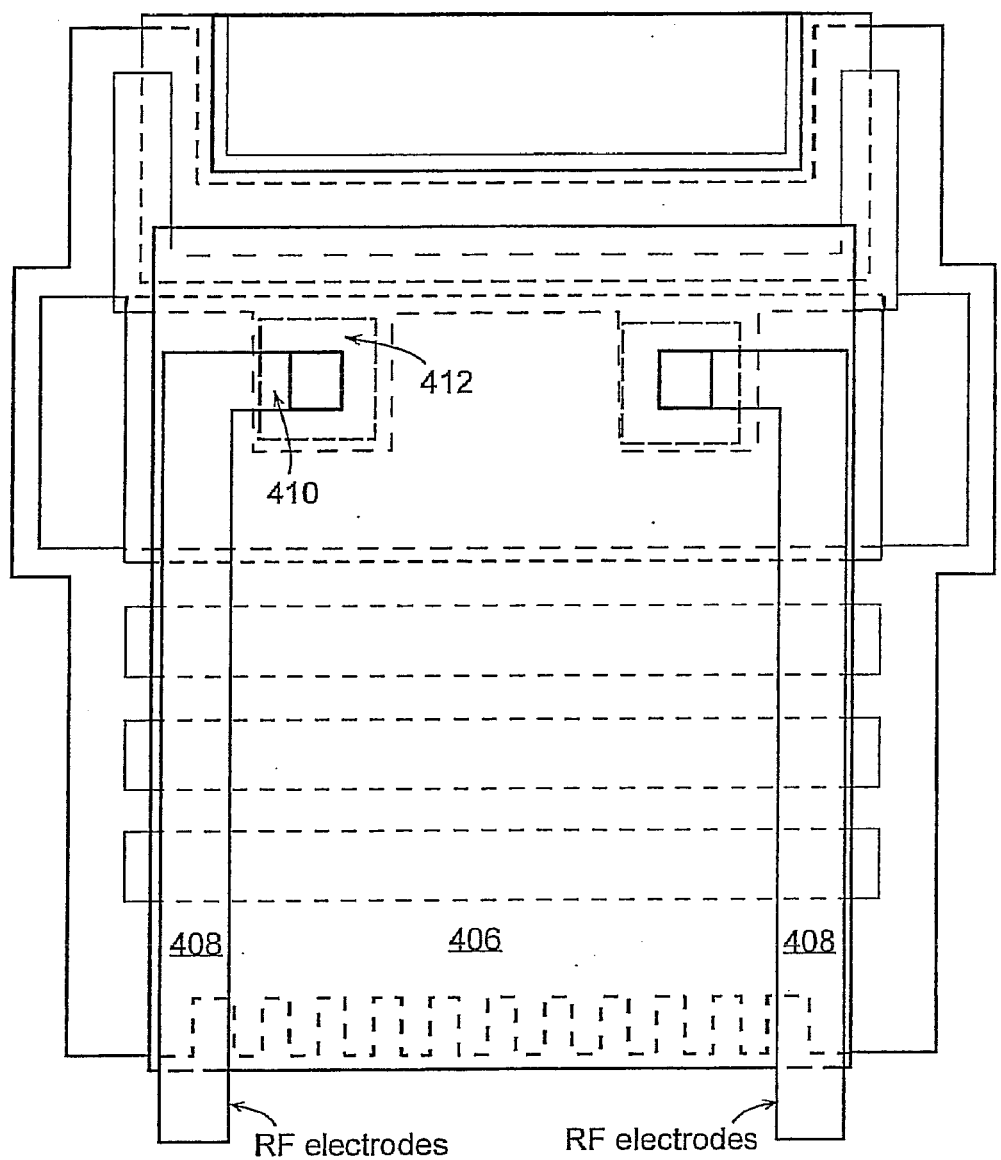
FIG. 20 is a schematic of a third embodiment of a DC switch having a two-finger design

FIG. 20 is an additional embodiment of the DC switch having a two finger design which is also a 4 terminal device. Instead of the thin aluminum of FIG. 19 as the actuation electrode on the bottom of the membrane containing the RF electrode, one can have the membrane becoming the pull-down electrode with the gold bars 408 on top of the membrane becoming the RF electrodes. FIG. 20 is similar to FIGS. 17A & 17B but now gold bars have been added on top of the membrane 362. The gold bars 408 are insulated from the aluminum in the pulldown electrode by the top oxide layer of the membrane 406. The gold bars 408 are connected to or become the contacts 410 by being fabricated in an opening 412 through the aluminum pulldown electrode 406.

Figure 21:
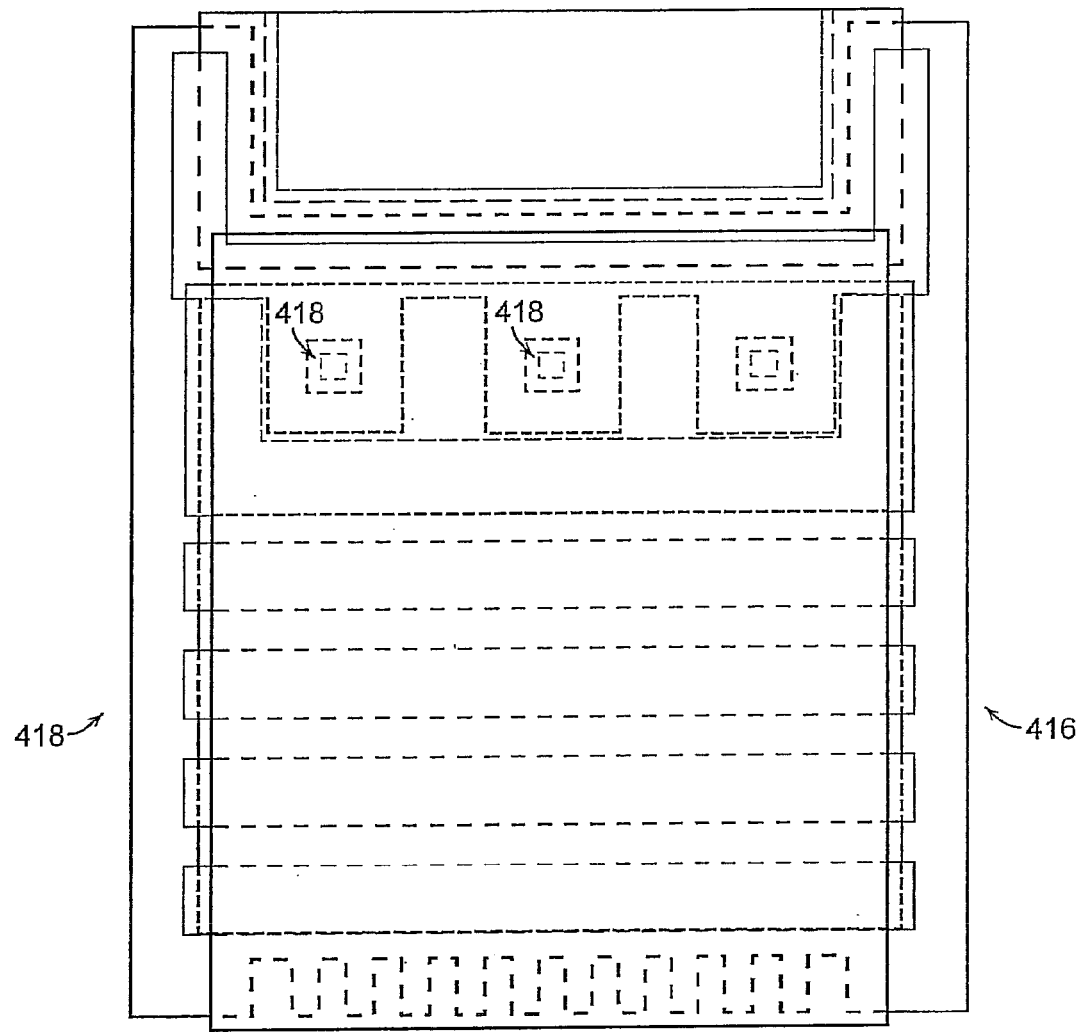
FIG. 21 is a schematic of a DC switch having a three-finger design.

FIG. 21 is a schematic of a DC switch 416 having a three-finger design. It is possible to have devices with arbitrary numbers of contacts 418 by placing fingers side by side. Multiple fingers will give lower resistance due to the parallel contacts as long as sufficient pressure is available from the electric field for each contact 418.

FIG. 22 is a schematic of a switch 444 having a one-finger capacitor and two-finger DC switch design. This switch is a combination of the capacitor and DC switches which were described earlier. In particular, FIG. 22 shows the top view of the switch 444. The switch 444 also includes a moving plate 448 having three RF zone corrugations 445. The RF corrugations 445 form the basis of the one-finger capacitor switch design. In addition, the moving plate 448 is designed with the dimples 454 as described herein. The regions 447 surrounding the dimples 454 are coated with a thin layer of resist for forming the two-finger DC design.

The cantilever membrane 446 includes a layer of silicon dioxide sized at 100 nm, aluminum sized at 3000 nm, and silicon dioxide sized at 100 nm. Also, the switch 444 includes bottom pull-down electrodes, which are positioned below the oxide layer of the switch 444. Moreover, these pull-down electrodes provide the necessary potential to pull the moving plate 448 toward a fixed plate 456 having a thin layer contact of platinum. In this embodiment, the dimples 454 are placed over the fixed plate 456, and also include a thin platinum contact on their bottom-most portion that comes into contact with the thin platinum contact of the fixed plate 456. Other materials can be used in place of the platinum contacts of the dimple 454 and fixed plate 456, such as gold, pladium or iridium or their alloys.

The switch 444 provides the capabilities wanted in both a capacitive switch and DC switch. In addition, as the DC part of the switch opens, there is still a capacitive component across the contacts associated with the capacitive part of the switch.

Although the present invention has been shown and described with respect to several preferred embodiments thereof, various changes, omissions and additions to the form and detail thereof, may be made therein, without departing from the spirit and scope of the invention.

What is claimed is:

1. A capacitive RE switch comprising:
a fixed electrode;
at least one pull-down electrode; and
a moving plate having a plurality of corrugations and a plurality of selective fingers are formed on a selective portion of said moving plate, said fingers are surrounded on three sides by the at least one pull down electrode and the corrugations respectively, said moving plate and fixed electrode are brought into intimate contact without necessarily having to apply a voltage between the fixed electrode and moving plate.

2. The capacitive switch of claim 1, wherein said at least one pull-down electrode comprises bottom electrodes.

3. The capacitive switch of claim 1, wherein said at least one pull-down electrode comprises segmented electrodes.

4. The switch of claim 1, wherein said selective finger is a one-finger design.

5. The capacitive switch of claim 4, wherein said moving plate comprises a moving plate.

6. The capacitive switch of claim 5, wherein said fixed electrode comprises a fixed plate.

7. The capacitive switch of claim 6, wherein said one-finger design positions said fixed plate to be surrounded by the moving plate and said at least one pull-down electrode.

8. The capacitive switch of claim 1, wherein said selective finger comprises a two-finger design.

9. The capacitive switch of claim 8, wherein said fixed electrode comprises two fixed plates.

10. The capacitive switch of claim 9, wherein said two-finger design is formed by positioning said fixed plates to be surrounded by the moving plate and said at least one pull-down electrode.

11. A DC RF switch comprising;
a fixed electrode;
at least one pull-down electrode; and
a moving plate having a plurality of corrugations and a plurality of selective fingers; said fingers are surrounded on three sides by the at least one pull down electrode and the corrugations respectively, said moving plate having at least one dimple that is formed on a selective portion of said moving plate and are positioned to come into contact with said fixed electrode when said switch is closed so as to increase the contact force and lowering resistance between said moving plate and fixed electrode.

12. The DC switch of claim 11, where said at least one pull-down electrode comprises bottom electrodes.

13. The DC switch of claim 11, wherein said fixed electrode comprises segmented electrodes.

14. The DC switch of claim 11 further comprising a thin layer of metal comprising platinum.

15. The DC switch of claim 11, wherein said at least one dimple comprises a thin layer of platinum.

16. The DC switch of claim 11, wherein said selective finger is a one-finger design.

17. The DC switch of claim 16, wherein said one-finger design is formed by using a single dimple.

18. The DC switch of claim 11, wherein said selective finger design is a two-finger design.

19. The DC switch of claim 18, wherein said two-finger design is formed by using two dimples.

20. The DC switch of claim 11, wherein said two-finger is used to form a varactor.

21. The DC switch of claim 11 further comprising a second set of pull-down electrodes is positioned beyond the fixed electrode.

22. A RF switch comprising:
a fixed electrode;
at least one pull-down electrode; and
a moving plate having a plurality of corrugations and a plurality of selective fingers;
said moving plate also having a selective portion that comprises a capacitive switch and a DC switch;
said capacitive switch comprising said selective fingers come into contact with said fixed electrode, said fingers are surrounded on three sides by the at least one pull down electrode and the corrugations respectively, said moving plate and fixed electrode are brought into intimate contact without necessarily having to apply a voltage between the two plates;
said DC switch comprising at least one dimple that is formed on said selective portion of said moving plate and are positioned to come into contact with said fixed electrode when said switch is closed so as to increase the contact force and lower the resistance between said moving plate and fixed electrode.

23. The switch of claim 22, wherein said at least one pull-down electrode comprises bottom electrodes.

24. The switch of claim 22, wherein said at least one pull-down electrode comprises segmented electrodes.

25. The switch of claim 22, wherein said capacitive switch comprises a one-finger design.

26. The switch of claim 25, wherein said moving plate comprises a moving plate.

27. The switch of claim 26, wherein said fixed electrode comprises fixed plate.

28. The switch of claim 22, further comprising a thin layer of metal comprising platinum.

29. The switch of claim 22, wherein said at least one dimplee comprises a thin layer of platinum.

30. The switch of claim 22, wherein said selective finger of said DC switch is a one-finger design.

31. A method of forming a capacitive RF switch:
providing a fixed electrode;
providing at least one pull-down electrode; and
providing a moving plate having a plurality of corrugations and a plurality of selective fingers are formed on a selective portion of said moving plate, said fingers are surrounded on three sides by the at least one pull down electrode and the corrugations respectively, said moving plate and fixed electrode are brought into intimate contact without necessarily having to apply a voltage between the fixed electrode and moving plate.

32. The method of claim 31, wherein said at least one pull-down electrode comprises bottom electrodes.

33. The method of claim 31, wherein said at least one pull-down electrode comprises segmented electrodes.

34. The method of claim 31, wherein said selective finger is a one-finger design.

35. The method of claim 34, wherein said moving plate comprises a moving plate.

36. The method of claim 5, wherein said fixed electrode comprises fixed plate.

37. The method of claim 36, wherein said one-finger design positions said fixed plate to be surrounded by the moving plate and said at least on pull-down electrode.

38. The method of claim 31, wherein said selective finger comprises a two-finger design.

39. The method of claim 38, wherein said fixed electrode comprises two fixed plates.

40. The method of claim 39, wherein said two-finger design is formed by positioning said fixed plates to be surrounded by the moving plate and said at least on pull-down electrode.

41. A method of forming a DC RF switch comprising;
providing a fixed electrode;
forming at least one pull-down electrode; and
forming a moving plate having a plurality of corrugations and a plurality of selective fingers; said fingers are surrounded on three sides by the at least one pull down electrode and the corrugations respectively, said moving plate having at least one dimple that is formed on a selective portion of said moving plate and are positioned to come into contact with said fixed electrode when said switch is closed so as to increase the contact force and lowering resistance between said moving plate and fixed electrode.

42. The method of claim 41, where said at least one pull-down electrode comprises bottom electrodes.

43. The method of claim 41, wherein said fixed electrode comprises segmented electrodes.

44. The method of claim 41, further comprising a thin layer of metal comprising platinum.

45. The method of claim 41, wherein said at least one dimple comprises a thin layer of platinum.

46. The method of claim 41, wherein said selective finger is a one-finger design.

47. The method of claim 46, wherein said one-finger design is formed by using a single dimple.

48. The method of claim 41, wherein said selective finger is a two-finger design.

49. The method of claim 48, wherein said two-finger design is formed by using two dimples.

50. The method of claim 41, wherein said two-finger design is used to form a varactor.

51. The method of claim 41 further comprising providing a second set of pull-down electrodes is positioned beyond the fixed electrode.

52. A method of forming an RF switch comprising:
providing a fixed electrode;
providing at least one pull-down electrode;
forming a moving plate having a plurality of corrugations and a plurality of selective finger designs said moving plate also having a selective portion that comprises a capacitive switch and a DC switch;
said capacitive switch comprising said selective fingers come into contact with said fixed electrode, said fingers are surrounded on three sides by the at least one pull down electrode and the corrugations respectively, said moving plate and fixed electrode are brought into intimate contact without necessarily having to apply a voltage between the two plates; and
said DC switch comprising at least one dimple that is formed on said selective portion of said moving plate and are positioned to come into contact with said fixed electrode when said switch is closed so as to increase the contact force and lower the resistance between said moving plate and fixed electrode.

53. The method of claim 52, wherein said at least one pull-down electrode comprises bottom electrodes.

54. The method of claim 52, wherein said at least one pull-down electrode comprises segmented electrodes.

55. The method of claim 52, wherein said capacitive switch comprises a one-finger design.

56. The method of claim 55, wherein said moving plate comprises a moving plate.

57. The method of claim 56, wherein said fixed electrode comprises fixed plate.

58. The method of claim 52 further comprising a thin layer of metal comprising platinum.

59. The method of claim 52, wherein said at least one dimple comprises a thin layer of platinum.

60. The method of claim 52, wherein said selective finger of said DC switch is a one-finger design.

* * * * *